(12) United States Patent
Tirre et al.

(10) Patent No.: US 8,590,125 B2
(45) Date of Patent: Nov. 26, 2013

(54) DEVICE FOR CUTTING AND BURNISHING A SURFACE OF A WORK PIECE

(75) Inventors: Paul Anthony Tirre, Warwickshire (GB); Ronald Keith Jackson, Warwickshire (GB)

(73) Assignee: Cogsdill Nuneaton Ltd., Warwickshire (GB)

( * ) Notice: Subject to any disclaimer, the term of this patent is extended or adjusted under 35 U.S.C. 154(b) by 343 days.

(21) Appl. No.: 12/963,047

(22) Filed: Dec. 8, 2010

(65) Prior Publication Data

US 2011/0131779 A1    Jun. 9, 2011

Related U.S. Application Data

(60) Provisional application No. 61/283,686, filed on Dec. 8, 2009.

(51) Int. Cl.
*B24B 39/02* (2006.01)

(52) U.S. Cl.
USPC ............................................ 29/90.01; 72/112

(58) Field of Classification Search
USPC .......... 29/90.01, 90.3, 90.5; 72/113, 122, 123
See application file for complete search history.

(56) References Cited

U.S. PATENT DOCUMENTS

| | | | |
|---|---|---|---|
| 1,684,772 A | | 9/1928 | Manning |
| 2,387,453 A | | 10/1945 | MacGuire et al. |
| 2,395,450 A | * | 2/1946 | Browning ............... 156/349 |
| 2,791,024 A | | 5/1957 | Vavrinek |
| 2,966,722 A | * | 1/1961 | Hull et al. ............. 29/90.01 |
| 3,059,314 A | | 10/1962 | Bourcier De Carbon |
| 3,069,750 A | | 12/1962 | Koppelmann |
| 3,130,477 A | | 4/1964 | Gill |
| 3,307,254 A | | 3/1967 | Williams |
| 3,389,621 A | | 6/1968 | Wear |
| 3,760,660 A | | 9/1973 | Van Arnam et al. |

(Continued)

FOREIGN PATENT DOCUMENTS

| DE | 813919 C | 9/1951 |
|---|---|---|
| DE | 1028853 B | 4/1958 |

(Continued)

OTHER PUBLICATIONS

International Search Report for International Application No. PCT/GB2010/052052; mailed Mar. 10, 2011; 5 pages.

(Continued)

*Primary Examiner* — David Bryant
*Assistant Examiner* — Matthew P Travers
(74) *Attorney, Agent, or Firm* — Howard & Howard Attorneys PLLC

(57) ABSTRACT

The subject invention provides for a device coupled to a machine for cutting and burnishing a surface of a work piece and a tool attachment assembly for the device. The device includes a cap movable between an engaged position preventing removal of a first modular insert from a cavity when in a cutting mode and a second modular insert from the cavity when in a burnishing mode and a disengaged position allowing independent removal of the first modular insert from the cavity when in the cutting mode and the second modular insert from the cavity when in the burnishing mode. The tool attachment assembly includes a biasing apparatus engaging a support to apply a first force to the support and a burnishing member with the support being rotatable relative to a modular insert in response to a reaction force.

26 Claims, 15 Drawing Sheets

(56) References Cited

U.S. PATENT DOCUMENTS

| | | |
|---|---|---|
| 3,795,957 A | 3/1974 | Steusloff |
| 3,840,957 A * | 10/1974 | Koppelmann ............... 29/90.01 |
| 4,067,251 A | 1/1978 | Eckle et al. |
| 4,133,089 A | 1/1979 | Heymanns |
| 4,250,775 A | 2/1981 | Jerue et al. |
| 4,367,576 A | 1/1983 | Dickinson |
| 4,380,851 A | 4/1983 | Dickinson |
| 4,425,693 A | 1/1984 | Dickinson |
| 4,508,475 A * | 4/1985 | Peuterbaugh ................. 408/153 |
| 4,509,885 A | 4/1985 | Dickinson |
| 4,527,929 A | 7/1985 | Dickinson et al. |
| 4,574,442 A | 3/1986 | Dickinson et al. |
| RE32,211 E | 7/1986 | Jerue et al. |
| 4,617,846 A | 10/1986 | Horsch |
| 4,648,757 A | 3/1987 | Plummer |
| 4,793,748 A | 12/1988 | Santi |
| 4,847,975 A | 7/1989 | Santi |
| 5,086,676 A | 2/1992 | Gifford et al. |
| 5,120,167 A | 6/1992 | Simpson |
| 5,307,714 A | 5/1994 | Muendlein et al. |
| 5,544,985 A | 8/1996 | Lane |
| 5,836,727 A | 11/1998 | Scheer |
| 5,960,687 A | 10/1999 | Rohrberg |
| 6,134,996 A | 10/2000 | Scheer et al. |
| 6,367,137 B1 | 4/2002 | Porter et al. |
| 6,487,945 B1 | 12/2002 | Leiber |
| 6,487,946 B1 | 12/2002 | Schroder |
| 6,560,835 B2 | 5/2003 | Porter et al. |
| 6,932,358 B1 | 8/2005 | Geisman et al. |
| 7,089,837 B2 | 8/2006 | Feil et al. |
| 7,266,873 B2 | 9/2007 | Okajiima et al. |
| 7,272,877 B2 | 9/2007 | Cardemon et al. |
| 2005/0047883 A1 | 3/2005 | Bixler |
| 2009/0178261 A1 | 7/2009 | Shiou et al. |

FOREIGN PATENT DOCUMENTS

| | | |
|---|---|---|
| DE | 2025006 A1 | 4/1971 |
| DE | 2012643 A1 | 10/1971 |
| DE | 3245195 A1 | 6/1984 |
| DE | 3246994 A1 | 6/1984 |
| EP | 0111787 A2 | 6/1984 |
| EP | 0111787 A3 | 6/1984 |
| EP | 0111787 B1 | 6/1984 |
| EP | 0382474 A2 | 8/1990 |
| EP | 0382474 A2 | 10/1995 |
| EP | 0382474 A3 | 10/1995 |
| EP | 0382474 B1 | 10/1995 |
| EP | 2095897 A1 | 9/2009 |
| FR | 967093 A | 10/1950 |
| FR | 1038110 A | 9/1953 |
| GB | 391980 A | 5/1933 |
| GB | 1573194 A | 8/1980 |
| GB | 2131332 A | 6/1984 |
| GB | 2204513 A | 11/1988 |
| JP | 3196905 A | 8/1991 |
| JP | 9168902 A | 6/1997 |
| JP | 2005131742 A | 5/2005 |
| WO | 2004012887 A2 | 2/2004 |

OTHER PUBLICATIONS

European Publication No. 0111787 and English language translation and English language Abstract of European Publication No. 0111787 from the European Patent Office; 19 pages.

German Publication No. 2012643 and English language translation of German Publication No. 2012643 from the European Patent Office; 11 pages.

German Publication No. 3245195 and English language translation and English language Abstract of German Publication No. 3245195 from the European Patent Office; 21 pages.

German Publication No. 3246994 and English language translation and English language Abstract of German Publication No. 3246994 from the European Patent Office; 28 pages.

German Publication No. 813919 and English language translation of German Publication No. 813919 from the European Patent Office; 9 pages.

French Publication No. 1038110 and English language translation of French Publication No. 1038110 from the European Patent Office; 9 pages.

French Publication No. 967093 and English language translation of French Publication No. 967093 from the European Patent Office; 7 pages.

Japanese Publication No. 9168902, English language Abstract of Japanese Publication No. 9168902 from European Patent Office, and English language translation of Japanese Publication No. 9168902 from the Japanese Patent Office; 19 pages.

Japanese Publication No. 2005-131742, English language Abstract of Japanese Publication No. 2005-131742 from the European Patent Office, and English language translation of Japanese Publication No. 2005-131742 from Japanese Patent Office; 23 pages.

* cited by examiner

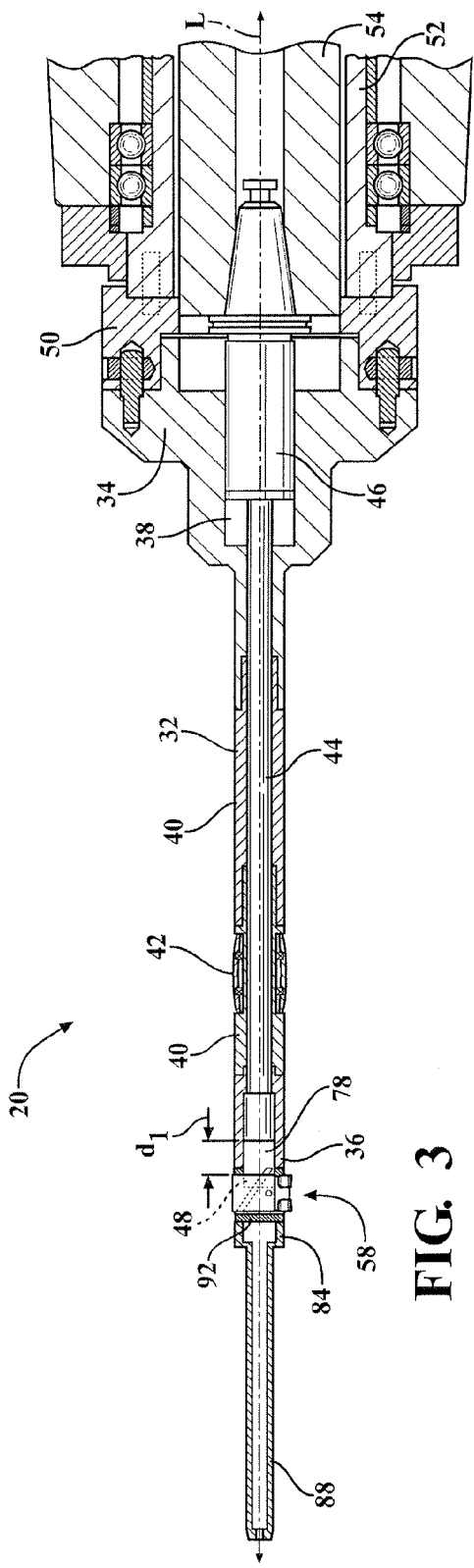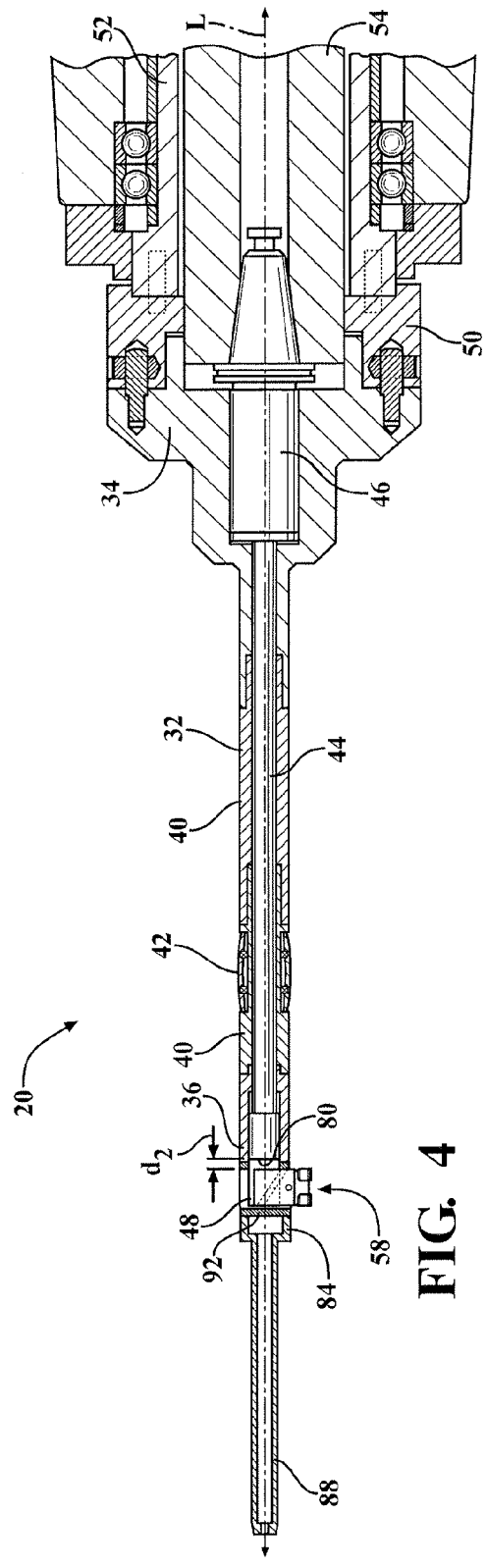

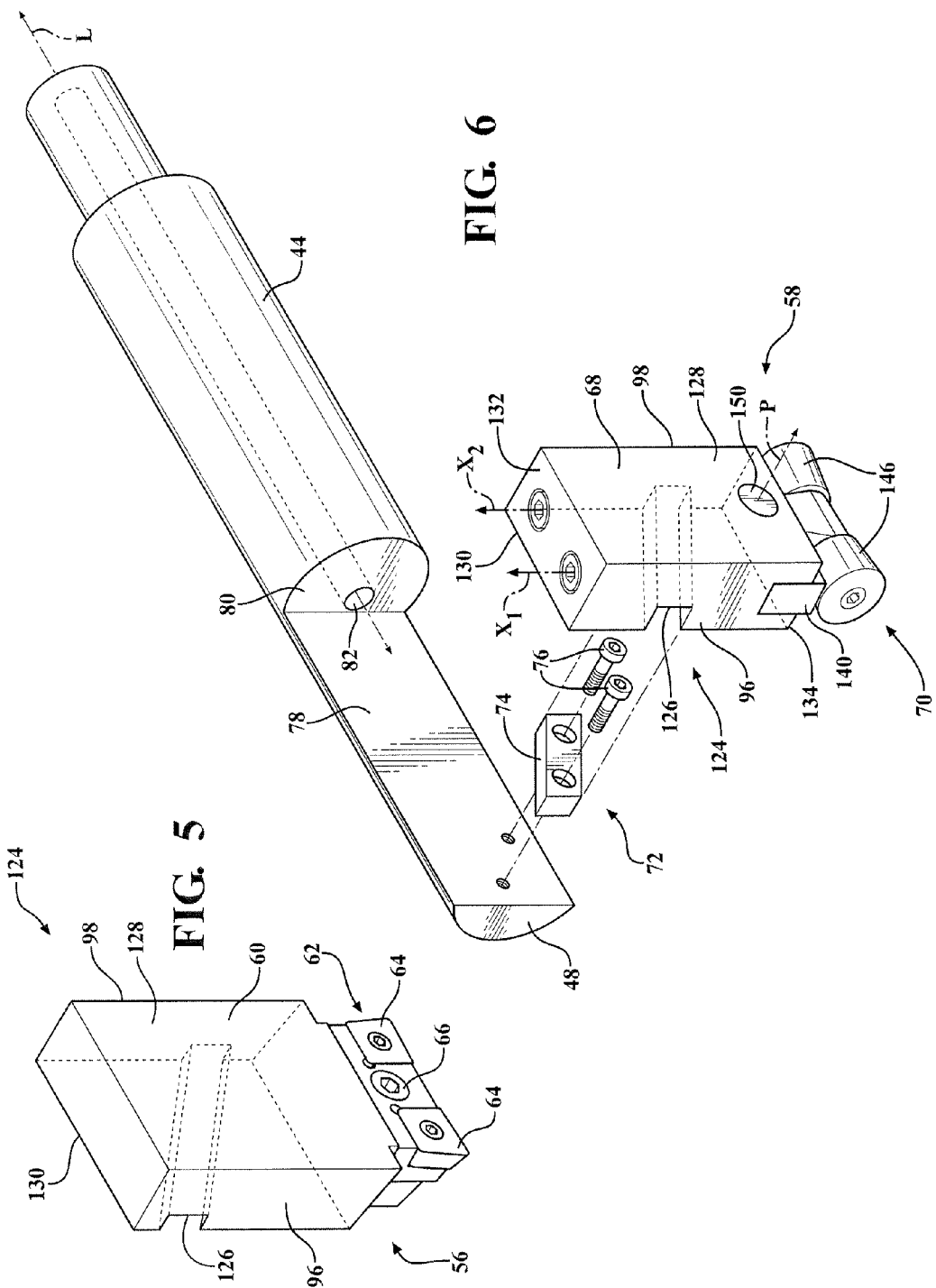

US 8,590,125 B2

DEVICE FOR CUTTING AND BURNISHING A SURFACE OF A WORK PIECE

CROSS REFERENCE TO RELATED APPLICATION

This application claims the benefit of U.S. Provisional Patent Application Ser. No. 61/283,686, filed on Dec. 8, 2009, the disclosure of which is hereby incorporated by reference in its entirety.

BACKGROUND OF THE INVENTION

1. Field of the Invention

The subject invention generally relates to a device coupled to a machine for cutting and burnishing a surface of a work piece and a tool attachment assembly for the device.

2. Description of the Related Art

Tools including a plurality of cutters for cutting a surface of a work piece are known in the art. In addition, tools including a burnisher for burnishing the surface of the work piece are also known in the art. For example, one type of tool for cutting the surface is disclosed in U.S. Pat. No. 5,120,167 (the '167 patent) to Simpson. The tool disclosed in the '167 patent includes a cylindrical shaft and an actuator rod disposed in the cylindrical shaft. The tool includes a pair of cutter blocks coupled to the actuator rod. The cutter blocks include cutting inserts selectively engaging the surface of the work piece in response to movement of the actuator rod for cutting the surface to a desired configuration. In other words, movement of the actuator rod causes movement of the cutter blocks which moves the cutting inserts toward or away from the surface of the work piece.

The tool includes a support body selectively attached to the cylindrical shaft with the support body housing the cutter blocks. Therefore, the support body with the cutter blocks and the cutting inserts are detachable from the cylindrical shaft of the tool as a unit. However, the cutter blocks cannot simply be removed from the actuator rod when the support body is detached from the cylindrical shaft. Instead, this type of tool is designed only to allow removal of the support body with the cutter blocks and the cutting inserts as the unit. As such, the cutter blocks cannot be independently removed from the actuator rod one at a time. Further, this tool is only for cutting surfaces of the work piece and not designed to be interchangeable with a burnisher for burnishing the surface of the work piece.

Therefore, there remains an opportunity to develop a device and a tool attachment assembly.

SUMMARY OF THE INVENTION AND ADVANTAGES

The subject invention provides for a device coupled to a machine for cutting and burnishing a surface of a work piece. The device includes a body having a proximal end adapted to be coupled to the machine for rotating the body about a longitudinal axis and a distal end spaced from the proximal end along the longitudinal axis. The body defines a cavity along the longitudinal axis. The device further includes an actuator disposed in the cavity of the body and including a first end adapted to be coupled to the machine and a second end spaced from the first end with the second end adjacent the distal end of the body. The actuator is rotatable about the longitudinal axis concurrently with the rotation of the body and movable along the longitudinal axis between a first position and a second position. The device also includes a first modular insert coupled to the actuator when the device is in a cutting mode. The first modular insert is movable radially relative to the longitudinal axis between a retracted position when the actuator is in the first position and an extended position when the actuator is in the second position. The device additionally includes a cutting member coupled to the first modular insert when in the cutting mode. The cutting member is movable with the first modular insert radially relative to the longitudinal axis between the retracted position for preventing cutting of the surface of the work piece and the extended position for cutting the surface of the work piece. In addition, the device includes a second modular insert coupled to the actuator when the device is in a burnishing mode with the burnishing mode being different from the cutting mode. The second modular insert is movable radially relative to the longitudinal axis between a retracted position when the actuator is in the first position and an extended position when the actuator is in the second position. The device also includes a burnishing member coupled to the second modular insert when in the burnishing mode. The burnishing member is movable with the second modular insert radially relative to the longitudinal axis between the retracted position for preventing burnishing of the surface of the work piece and the extended position for burnishing the surface of the work piece. The device further includes a cap movable between an engaged position and a disengaged position. When in the engaged position, the cap is coupled to the distal end of the body and prevents removal of the first modular insert and the cutting member from the cavity when in the cutting mode and the second modular insert and the burnishing member from the cavity when in the burnishing mode such that one of the first and second modular inserts remain coupled to the actuator. When in the disengaged position, the cap is spaced from the distal end of the body and allows independent removal of the first modular insert and the cutting member from the cavity when in the cutting mode and the second modular insert and the burnishing member from the cavity when in the burnishing mode for uncoupling one of the first and second modular inserts from the actuator.

The subject invention also provides for a device coupled to a machine for cutting and burnishing a surface of a work piece. The device includes a body having a proximal end adapted to be coupled to the machine for rotating the body about a longitudinal axis and a distal end spaced from the proximal end along the longitudinal axis with the body defining a cavity along the longitudinal axis. The device further includes an actuator disposed in the cavity of the body and including a first end adapted to be coupled to the machine and a second end spaced from the first end with the second end adjacent the distal end of the body. The actuator is rotatable about the longitudinal axis concurrently with the rotation of the body and movable along the longitudinal axis between a first position and a second position. The device also includes a first modular insert coupled to the actuator when the device is in a cutting mode. The first modular insert is movable radially relative to the longitudinal axis between a retracted position when the actuator is in the first position and an extended position when the actuator is in the second position. In addition, the device includes a second modular insert coupled to the actuator when the device is in a burnishing mode with the burnishing mode being different from the cutting mode. The second modular insert is movable radially relative to the longitudinal axis between a retracted position when the actuator is in the first position and an extended position when the actuator is in the second position. The device further includes a cap movable between an engaged position and a disengaged position. When in the engaged position, the cap is coupled to the distal end of the body and prevents removal of the first modular insert from the cavity when in the cutting mode and the second modular insert from the cavity when in the burnishing mode such that one of the first and second modular inserts remain coupled to the actuator. When in the disengaged position, the cap is spaced from the distal end of the body and allows independent removal of the first modular insert from the cavity when in the cutting mode and the second modular insert from the cavity when in the burnishing mode for uncoupling one of the first and second modular inserts from the actuator.

The subject invention also provides for a device for burnishing a surface of a work piece. The device includes a body defining a cavity along a longitudinal axis with the body rotatable about the longitudinal axis. The device further includes an actuator disposed in the cavity of the body and rotatable about the longitudinal axis concurrently with the rotation of the body and the actuator movable along the longitudinal axis between a first position and a second position. The device also includes a modular insert coupled to the actuator and movable radially relative to the longitudinal axis between a retracted position when the actuator is in the first position and an extended position when the actuator is in the second position. In addition, the device includes a support coupled to the modular insert and having a burnishing member. The support is movable with the modular insert radially relative to the longitudinal axis between the retracted position when the actuator is in the first position for preventing engagement of the burnishing member with the surface of the work piece and the extended position when the actuator is in the second position for allowing engagement of the burnishing member with the surface of the work piece. The device further includes a biasing apparatus coupled to the modular insert and engaging the support to apply a first force to the support and the burnishing member with the support being rotatable relative to the modular insert in response to a reaction force for improving a finish of the surface of the work piece when the burnishing member engages the surface.

In addition, the subject invention provides for a tool attachment assembly for a device including a body and an actuator disposed in the body. The tool attachment assembly includes a modular insert adapted to be coupled to the actuator. The tool attachment assembly further includes a support coupled to the modular insert and having a burnishing member. The tool attachment assembly also includes a biasing apparatus coupled to the modular insert and engaging the support to apply a first force to the support and the burnishing member with the support being rotatable relative to the modular insert in response to a reaction force.

Therefore, the subject invention provides for a device allowing interchangeability of a first modular insert when the device is in a cutting mode with a second modular insert when the device is in a burnishing mode. In other words, the device can be utilized to cut or burnish a surface of a work piece. A cap is movable between an engaged position coupled to a distal end of a body and a disengaged position spaced from the distal end of the body for providing quick and easy accessibility to the first modular insert when in the cutting mode and the second modular insert when in the burnishing mode. Further, the subject invention provides for the device and a tool attachment assembly including a biasing apparatus coupled to a modular insert and engaging a support to apply a first force to the support and a burnishing member with the support being rotatable relative to the modular insert in response to a reaction force for improving a finish of the surface of the work piece when the burnishing member engages the surface of the work piece.

BRIEF DESCRIPTION OF THE DRAWINGS

Advantages of the subject invention will be readily appreciated, as the same becomes better understood by reference to the following detailed description, when considered in connection with the accompanying drawings.

FIG. 3 is a partial cross-sectional view of the device in the burnishing mode with the second modular insert in the retracted position and an actuator in a first position.

FIG. 4 is a partial cross-sectional view of the device in the burnishing mode with the second modular insert in the extended position and the actuator in a second position.

FIG. 5 is a perspective view of a first tool attachment assembly for the cutting mode.

FIG. 6 is an exploded perspective view of the actuator having an extension coupled thereto with the second modular insert defining a slot cooperating with the extension.

DETAILED DESCRIPTION OF THE INVENTION

Figure 1A:
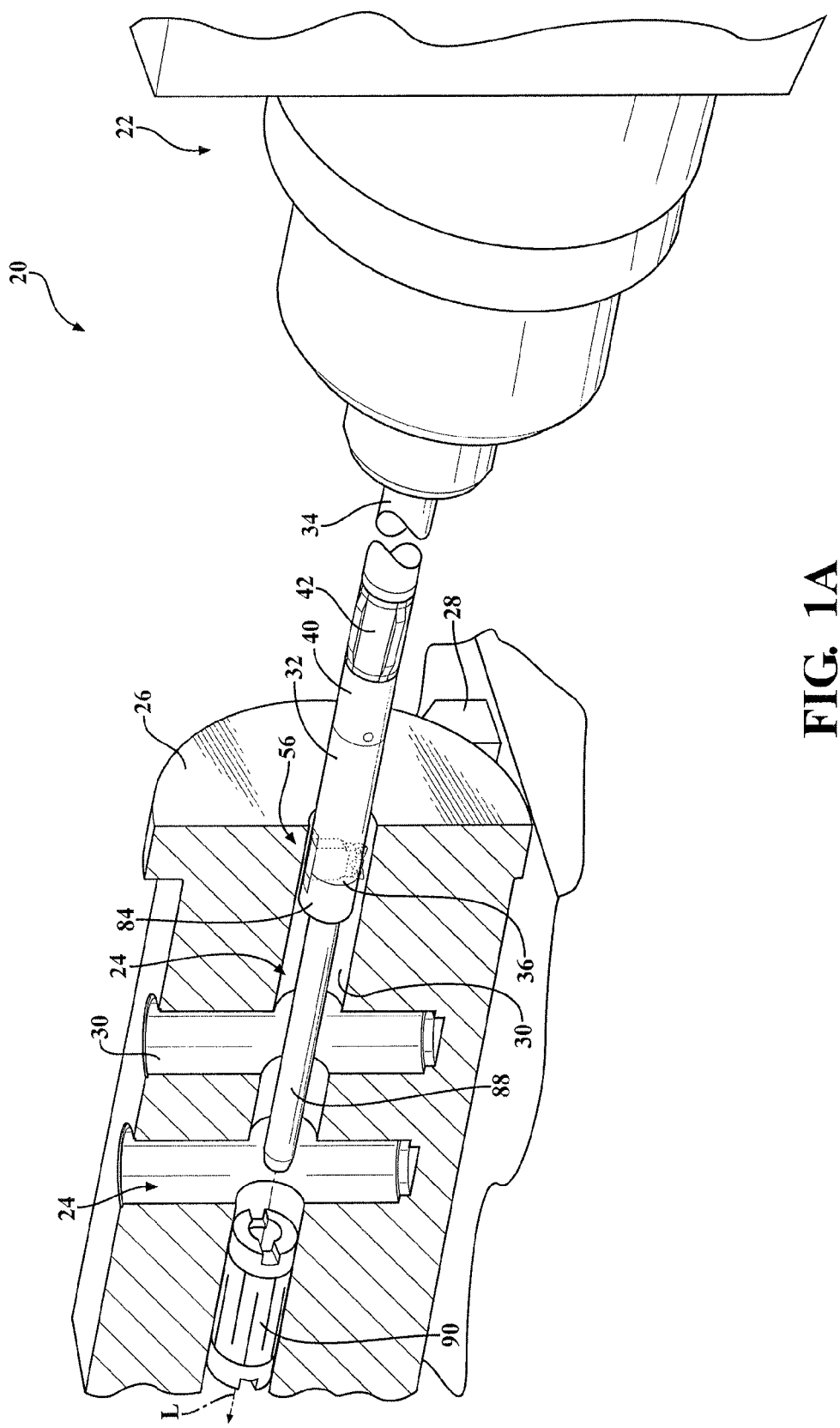
FIG. 1A is a perspective view of the device in a cutting mode with the device including a first modular insert in a retracted position prior to cutting a surface of a work piece.
Figure 1B:
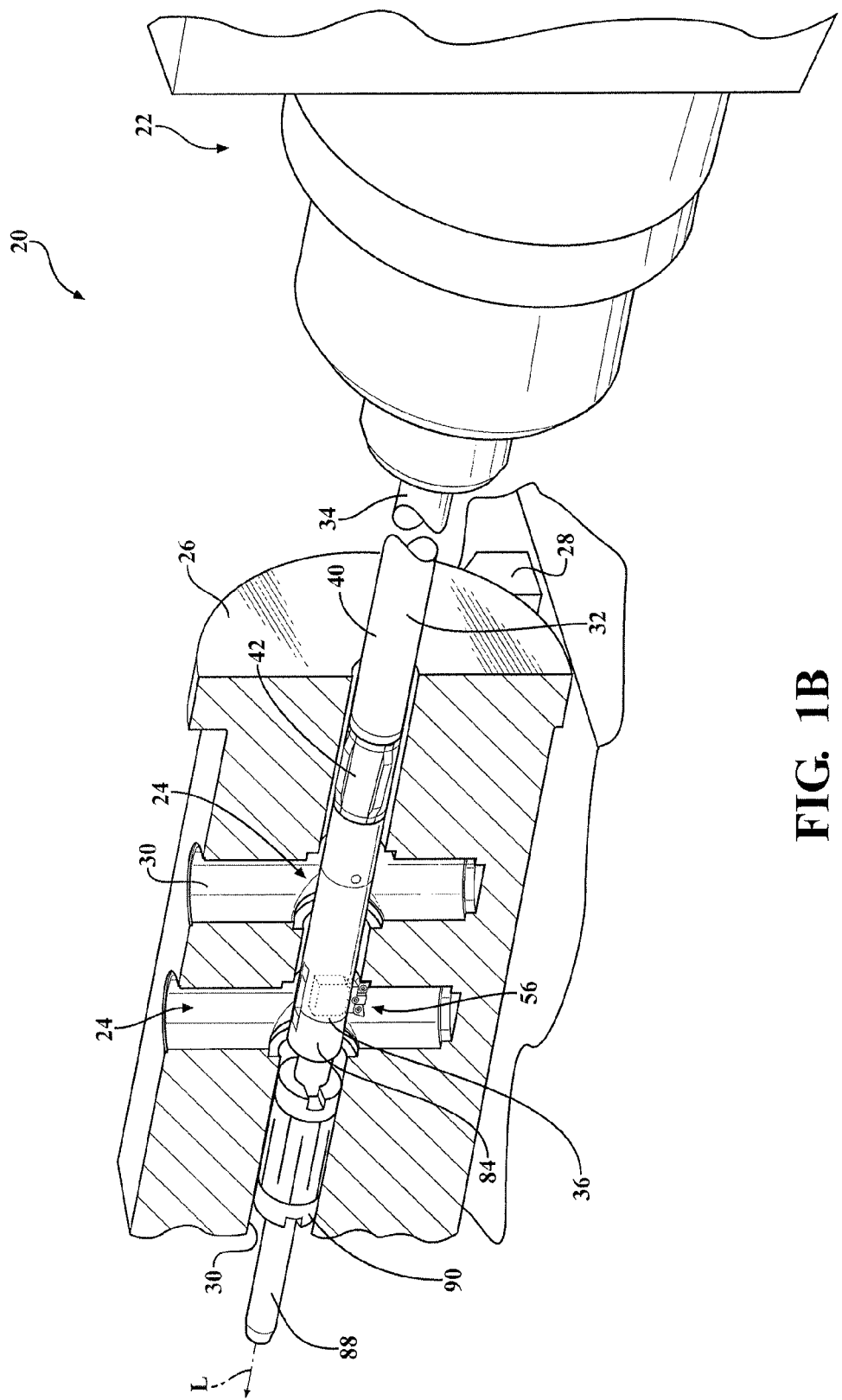
FIG. 1B is a perspective view of the device in the cutting mode with the first modular insert in an extended position cutting the surface of the work piece.

Referring to the Figures, wherein like numerals indicate like or corresponding parts throughout the several views, a device 20 coupled to a machine 22 for cutting and burnishing a surface 24 of a work piece 26 is generally shown in FIGS. 1A, 1B, 2A, 2B, 3, and 4. In other words, the device 20 can be utilized to cut or machine the surface 24 of the work piece 26 and the same device 20 can be utilized to burnish the surface 24 of the work piece 26, which will be discussed further below. Referring to FIGS. 1A and 1B, the device 20 is in a cutting mode for cutting the surface 24 of the work piece 26 and referring to FIGS. 2A and 2B, the device 20 is in a burnishing mode for burnishing the surface 24 of the work piece 26. A holder 28 can be utilized for securing the work piece 26 in a desired orientation while the device 20 cuts or burnishes the surface 24 of the work piece 26.

Typically, the work piece 26 defines at least one aperture 30 with the surface 24 of the aperture 30 being cut and/or burnished. More typically, the aperture 30 is further defined as a plurality of apertures 30 and the surface 24 is further defined as a plurality of surfaces 24. For example, the work piece 26 can be further defined as a valve body. It is to be appreciated that the work piece 26 can be any suitable configuration and the surface 24 (s) being cut or burnished can be any suitable configuration. In addition, the machine 22 can be further defined as a horizontal boring mill machine with the device 20 coupled thereto for cutting and/or burnishing the surface 24 of the work piece 26. It is to be appreciated that the device 20 can be coupled to any suitable machine for cutting and/or burnishing the surfaces 24 of the work piece 26.

Referring to FIGS. 3 and 4, the device 20 includes a body 32 having a proximal end 34 adapted to be coupled to the machine 22 for rotating the body 32 about a longitudinal axis L and a distal end 36 spaced from the proximal end 34 along the longitudinal axis L. The body 32 defines a cavity 38 along the longitudinal axis L and more specifically, the cavity 38 is disposed between the proximal and distal ends 34, 36 of the body 32. Even more specifically, the cavity 38 is disposed through the proximal and distal ends 34, 36 of the body 32.

The body 32 can define different lengths for cutting and burnishing the desired surface 24 (s) of the work piece 26. For example, the body 32 includes a plurality of segments 40 coupled to each other to define a length of the body 32. One or more of the segments 40 can be added to increase, or removed to decrease, the length of the body 32 as desired. Optionally, the body 32 can also include a damper 42 or anti-vibrational bushing coupled between a pair of the segments 40 for reducing vibration in the device 20. It is to be appreciated that the body 32 can also define different outer diameters and/or inner diameters as desired. It is to be appreciated that the segments 40 and/or the damper 42 can be coupled to each other by any suitable methods, such as for example, fasteners, pins, etc.

The device 20 further includes an actuator 44 disposed in the cavity 38 of the body 32. The actuator 44 includes a first end 46 adapted to be coupled to the machine 22 and a second end 48 spaced from the first end 46 with the second end 48 adjacent the distal end 36 of the body 32. The actuator 44 is rotatable about the longitudinal axis L concurrently with the rotation of the body 32. The actuator 44 is also movable along the longitudinal axis L between a first position as shown in FIG. 3 and a second position as shown in FIG. 4. It is to be appreciated that the actuator 44 can define any suitable length to correspond with the desired length of the body 32. In addition, it is to be appreciated that the actuator 44 can define different outer diameters corresponding to the desired inner diameter of the body 32. It is to further be appreciated that the actuator 44 can be moved to any position between the first and second positions.

The device 20 also includes a bonnet 50 coupled to the proximal end 34 of the body 32. The machine 22 includes a first spindle 52 selectively coupled to the bonnet 50 for rotating the body 32 about the longitudinal axis L. The first spindle 52 can be further defined as a milling spindle. The machine 22 also includes a second spindle 54 selectively coupled to the first end 46 of the actuator 44 for rotating the actuator 44 about the longitudinal axis L concurrently or in unison with the body 32 and for moving or translating the actuator 44 along the longitudinal axis L independently of the body 32. In other words, the body 32 is rotatable about the longitudinal axis L while the actuator 44 is able to rotate about and move along the longitudinal axis L. The second spindle 54 can be further defined as a boring spindle. It is to be appreciated that the first and second spindles 52, 54 can be coupled to the bonnet 50 and the actuator 44 respectively by any suitable method as known to those skilled in the art. For example, as shown in FIGS. 3 and 4, fasteners and/or pins can be utilized to couple the first spindle 52 to the bonnet 50 and the proximal end 34 of the body 32.

A plurality of tool attachment assemblies 56, 58 are utilized for the device 20 including the body 32 and the actuator 44 disposed in the body 32. The tool attachment assemblies 56, 58 are interchangeably coupled to the device 20 as discussed further below. One of the tool attachment assemblies 56 is utilized when the device 20 is in the cutting mode for cutting the surface 24 of the work piece 26 (see FIGS. 1A and 1B). Another one of the tool attachment assemblies 58 is utilized when the device 20 is in the burnishing mode for burnishing the surface 24 of the work piece 26 (see FIGS. 2A and 2B). The burnishing mode is different from the cutting mode with the burnishing mode typically occurring after the cutting mode for improving a finish of the surface 24 of the work piece 26. The tool attachment assembly 56 for the cutting mode will be referred to herein as a first tool attachment assembly 56 and the tool attachment assembly 58 for the burnishing mode will be referred to herein as a second tool attachment assembly 58.

As mentioned above, the body 32 and the actuator 44 rotate concurrently about the longitudinal axis L while the actuator 44 can also move along the longitudinal axis L independently of the body 32. A CNC machine 22 controls the rotation, position, and translation of the first and second spindles 52, 54 and thus the body 32 and the actuator 44 for cutting and burnishing the surfaces 24 of the work piece 26 to a desired configuration. Hence, the CNC machine 22 controls movement of the actuator 44 along the longitudinal axis L, which causes corresponding movement of the first or second tool attachment assemblies 56, 58 radially relative to the longitudinal axis L which is discussed further below.

Referring to FIGS. 1A, 1B, and 5, the device 20 and the first tool attachment assembly 56 includes a first modular insert 60 coupled to the actuator 44 when the device 20 is in the cutting mode. The first modular insert 60 is movable radially relative to the longitudinal axis L between a retracted position when the actuator 44 is in the first position as shown in FIG. 1A and an extended position when the actuator 44 is in the second position as shown in FIG. 1B. As best shown in FIG. 5, the first tool attachment assembly 56 further includes a cutting member 62 coupled to the first modular insert 60 when in the cutting mode for cutting the surface 24 of the work piece 26. The cutting member 62 is movable with the first modular insert 60 radially relative to the longitudinal axis L between the retracted position for preventing cutting of the surface 24 of the work piece 26 and the extended position for cutting the surface 24 of the work piece 26.

The cutting member 62 includes at least one cutter 64 coupled thereon for cutting or machining the surface 24 of the work piece 26. Typically, the cutter 64 is further defined as a plurality of cutters 64 spaced from each other. Any suitable fasteners 66, etc. can be utilized to couple and decouple the cutting member 62 and/or the cutters 64 from the first modular insert 60. It is to be appreciated that the extended position includes any radial position of the first modular insert 60 in which the cutting member 62, and more specifically the cutters 64, can cut the surface 24 of the work piece 26. Further, it is to be appreciated that the cutting member 62 can be completely retracted within the body 32 when in the retracted position or can protrude out of the body 32 when in the retracted position as long as the cutting member 62 is not cutting the surface 24 of the work piece 26.

Figure 2A:
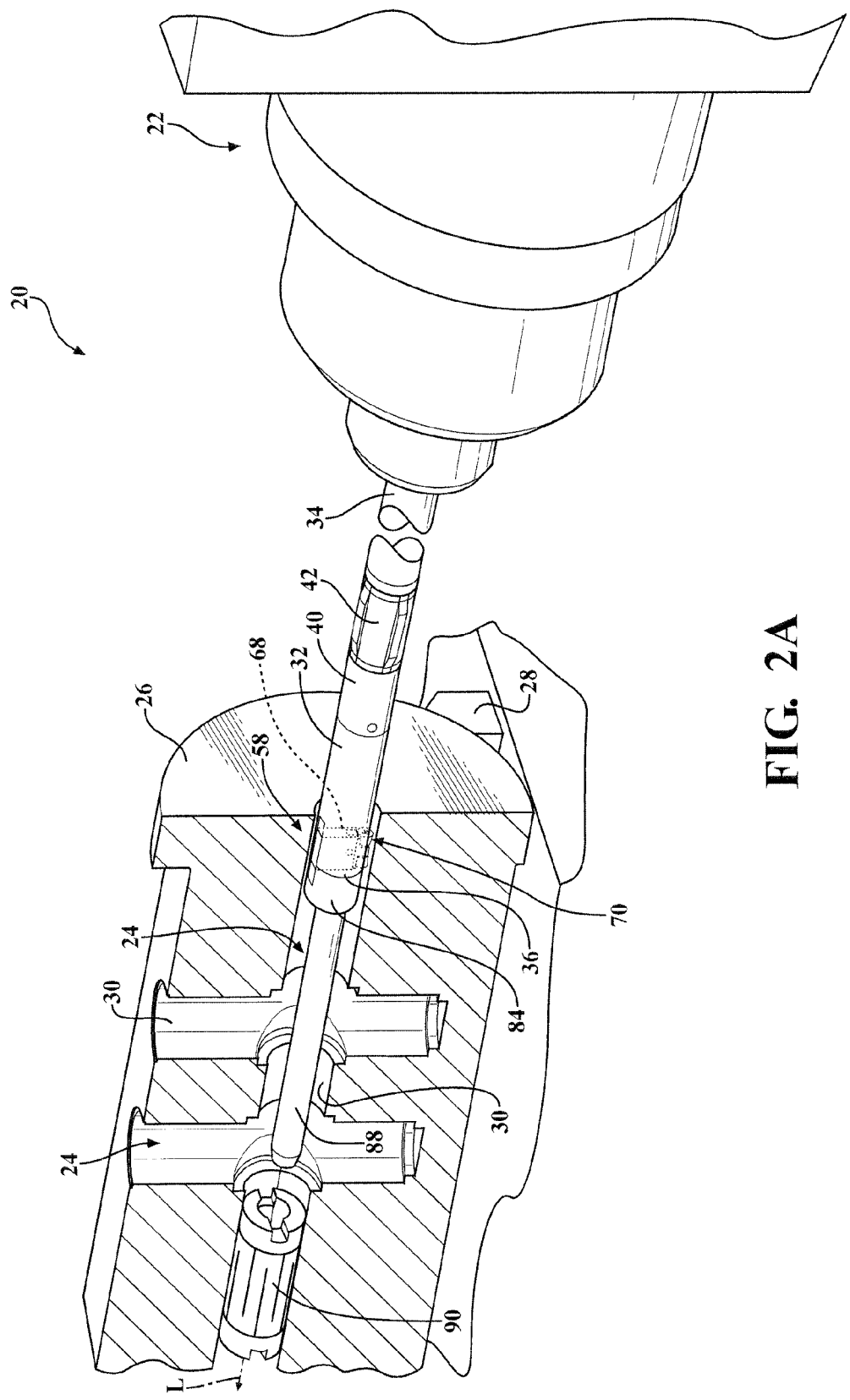
FIG. 2A is a perspective view of the device in a burnishing mode with the device including a second modular insert in a retracted position prior to burnishing the surface of the work piece.
Figure 2B:
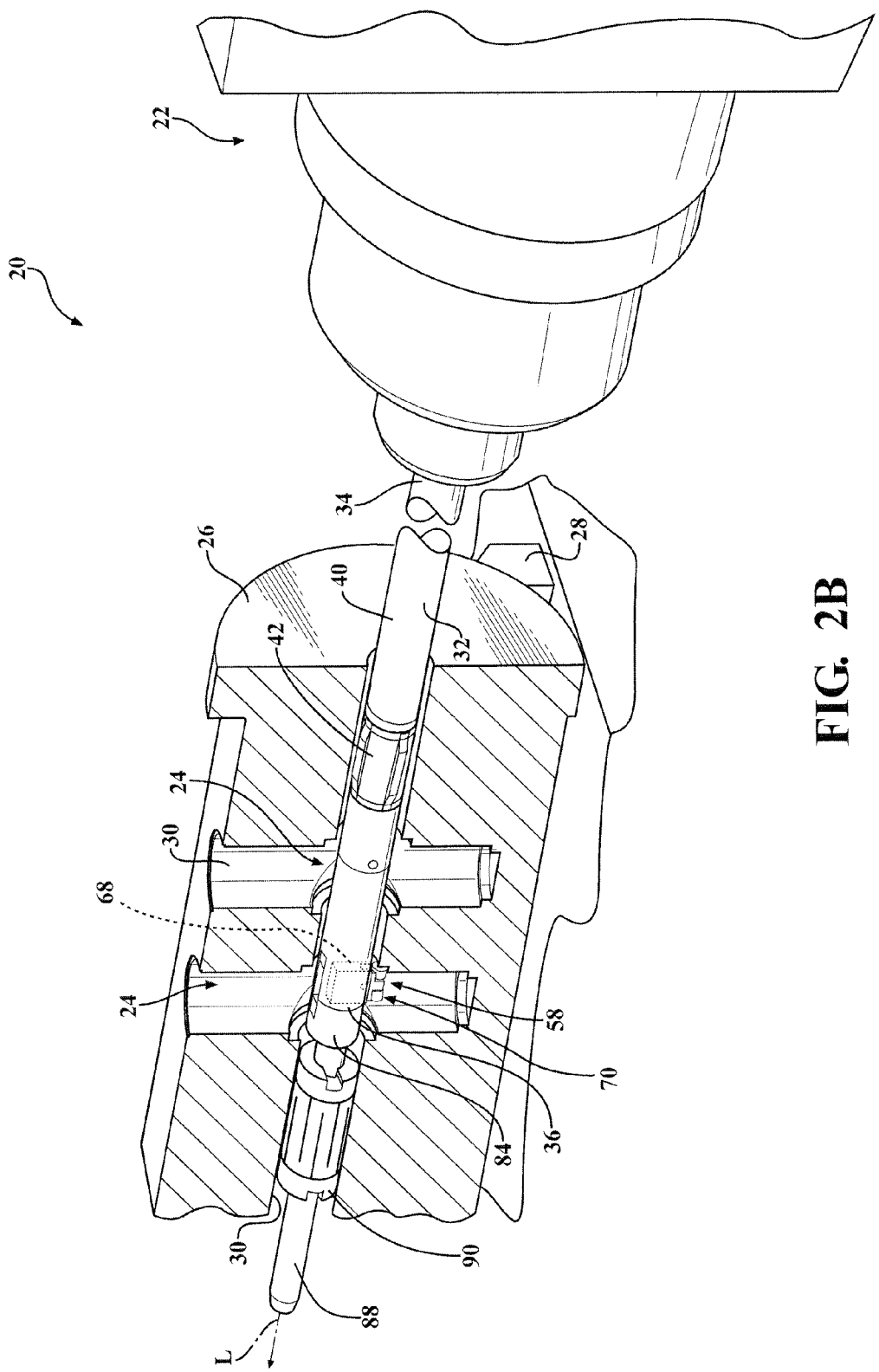
FIG. 2B is a perspective view of the device in the burnishing mode with the second modular insert in an extended position burnishing the surface of the work piece.

In addition, turning to FIGS. 2A and 2B the device 20 and the second tool attachment assembly 58 includes a second modular insert 68 coupled to the actuator 44 when the device 20 is in the burnishing mode. The second modular insert 68 is movable radially relative to the longitudinal axis L between a retracted position when the actuator 44 is in the first position as shown in FIGS. 2A and 3 and an extended position when the actuator 44 is in the second position as shown in FIGS. 2B and 4. A burnishing member 70 is coupled to the second modular insert 68 when in the burnishing mode for burnishing the surface 24 of the work piece 26. It is to be appreciated that the extended position includes any radial position of the second modular insert 68 in which the burnishing member 70 can burnish the surface 24 of the work piece 26. Further, it is to be appreciated that the burnishing member 70 can be completely retracted within the body 32 when in the retracted position or can protrude out of the body 32 when in the retracted position as long as the burnishing member 70 is not burnishing the surface 24 of the work piece 26. The second tool attachment assembly 58 and the burnishing member 70 will be discussed in detail further below.

Figure 7:
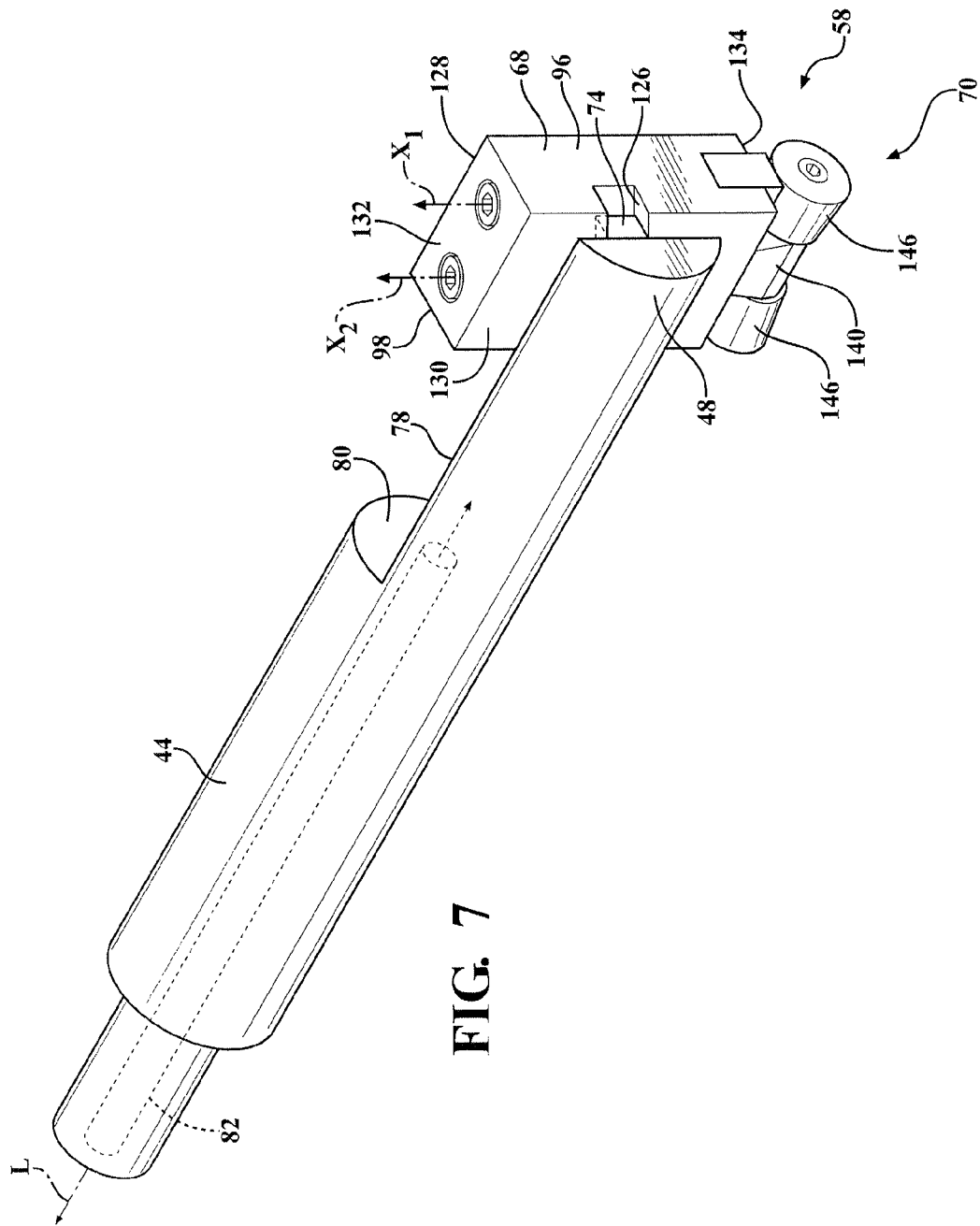
FIG. 7 is a perspective view of the extension of the actuator engaging the slot of the second modular insert.
Figure 8:
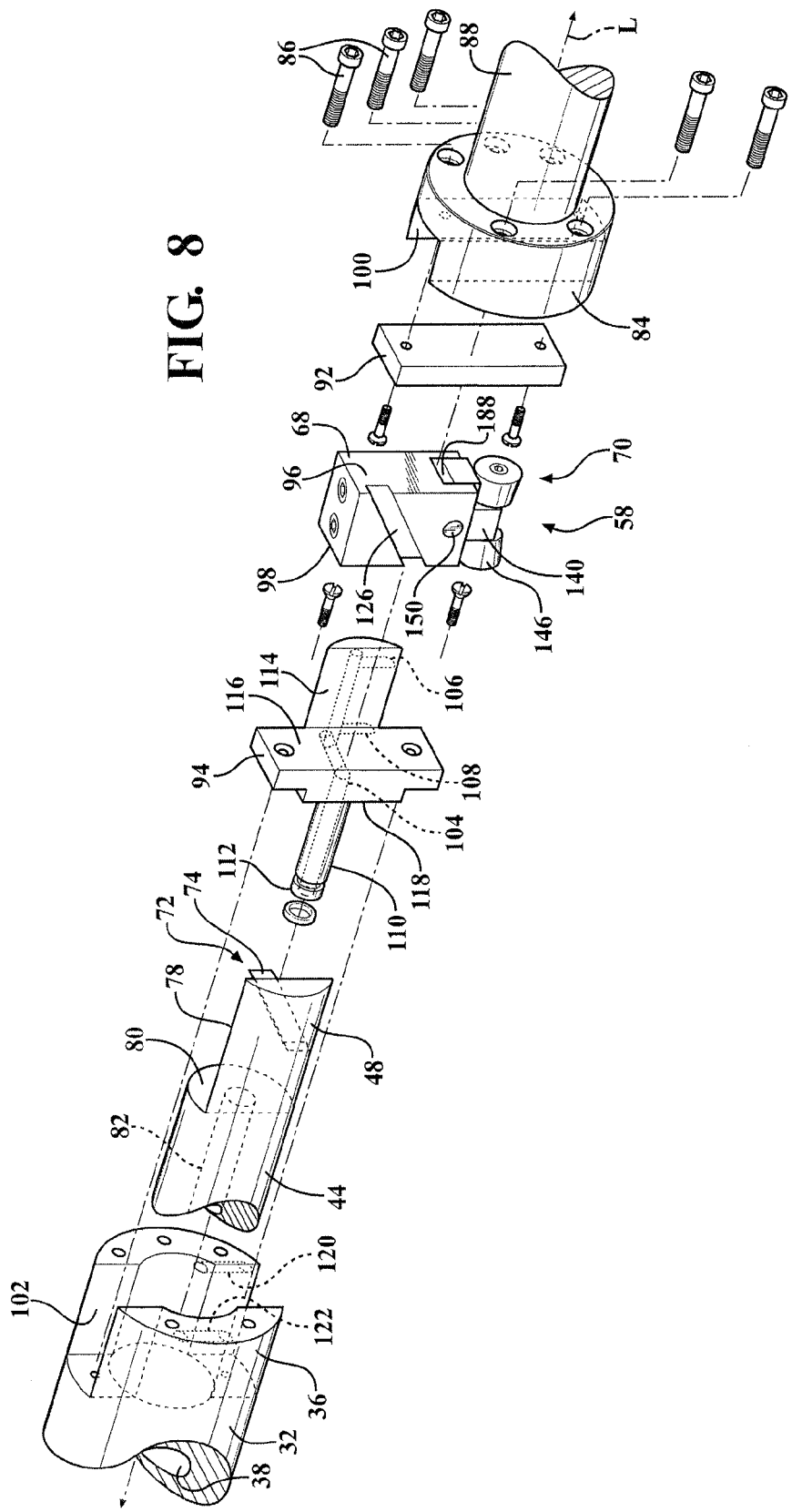
FIG. 8 is an exploded view of the device at a distal end of the body.

As best shown in FIGS. 6-8, the actuator 44 includes a first coupler 72 selectively engaging one of the first and second modular inserts 60, 68. More specifically, the first coupler 72 of the actuator 44 is further defined as an extension 74. Typically, the extension 74 of the actuator 44 is disposed adjacent the second end 48 of the actuator 44. For example, the extension 74 can be secured to the actuator 44 by fasteners 76. The fasteners 76 can be defined as counter-sunk screws or any other suitable fasteners for securing the extension 74 to the actuator 44. It is to be appreciated that the extension 74 can be integral with the actuator 44. It is to further be appreciated that the extension 74 can be secured to the actuator 44 by any suitable method.

The actuator 44 defines a recess 78 extending a predetermined distance from the second end 48 toward the first end 46 to define a shoulder 80 between the first and second ends 46, 48. The extension 74 of the actuator 44 is disposed in the recess 78. Typically, the extension 74 extends angularly from the second end 48 of the actuator 44 toward the shoulder 80 of the actuator 44. When one of the first and second modular inserts 60, 68 are coupled to the actuator 44, the respective first and second modular inserts 60, 68 is spaced a first distance $d_1$ from the shoulder 80 of the actuator 44 when the actuator 44 is in the first position and the respective first and second modular inserts 60, 68 is spaced a second distance $d_2$ from the shoulder 80 of the actuator 44 when the actuator 44 is in the second position with the second distance $d_2$ being less than the first distance $d_1$. FIG. 3 illustrates the actuator 44 in the first position and spaced the first distance $d_1$ from the shoulder 80 and FIG. 4 illustrates the actuator 44 in the second position and spaced the second distance $d_2$ from the shoulder 80. It is to be appreciated that the shoulder 80 can be any suitable configuration and thus the first and second distances $d_1$, $d_2$ can be any suitable distance. Further, it is to be appreciated that the first and second distances $d_1$, $d_2$ have been exaggerated for illustrative purposes only.

Referring back to FIGS. 6-8, the actuator 44 further defines a passage 82 extending between the first and second ends 46, 48 along the longitudinal axis L for providing fluid to the work piece 26. More specifically, the passage 82 of the actuator 44 extends between the first and second ends 46, 48 along the longitudinal axis L for providing fluid to the work piece 26 and the cutting member 62 when in the cutting mode and the burnishing member 70 when in the burnishing mode. Typically, the passage 82 of the actuator 44 extends between the shoulder 80 and the first end 46 for providing fluid to the work piece 26 and more typically, to the work piece 26 and the cutting member 62 when in the cutting mode and the burnishing member 70 when in the burnishing mode. For example, fluid prevents heat build-up in the work piece 26 and/or the cutting and burnishing members 62, 70. In addition, fluid removes chips of material from the work piece 26 as the cutting member 62 cuts the surface 24 of the work piece 26. The fluid can be further defined as a liquid and typically, the liquid can be defined as a coolant. It is to be appreciated that any suitable fluid can be utilized.

Figure 10:
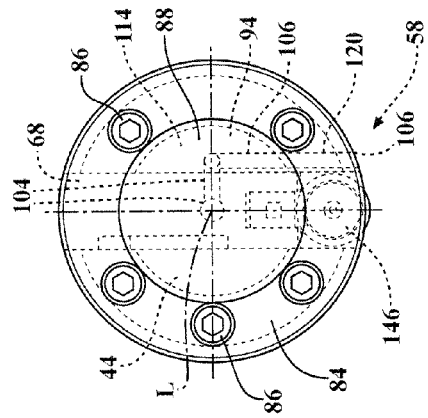
FIG. 10 is an end view of the device including a cap at the distal end of the body.
Figure 11:
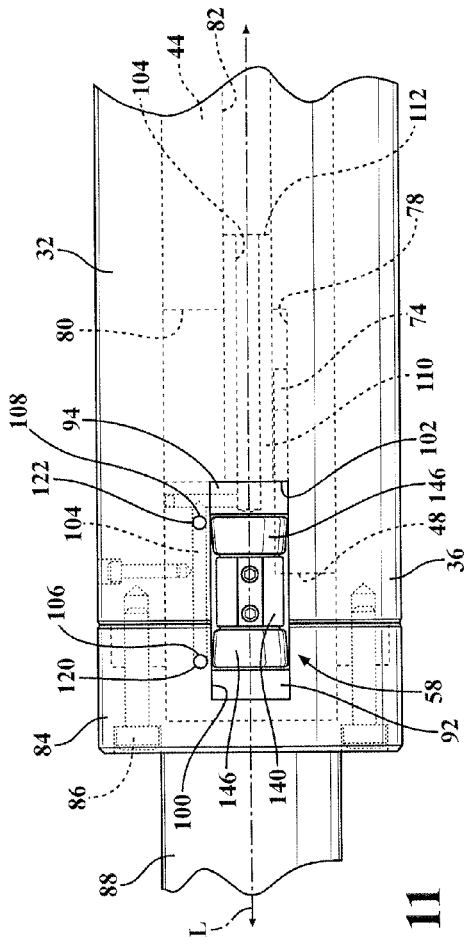
FIG. 11 is a bottom view of the device at the distal end of the body.
Figure 12:
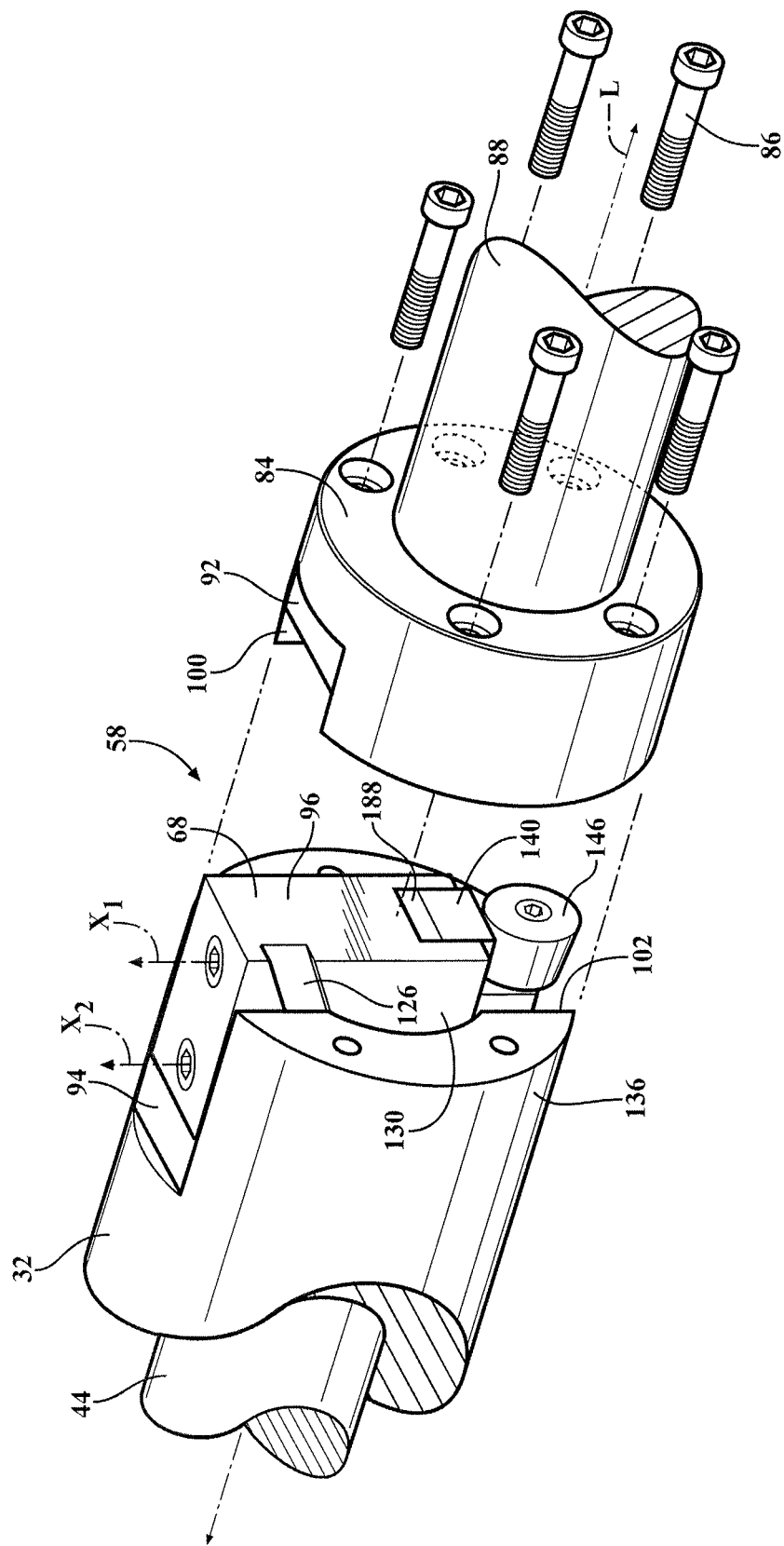
FIG. 12 is broken perspective view of the body, the actuator, and the cap with the cap in a disengaged position.

The device 20 further includes a cap 84 movable between an engaged position as shown in FIGS. 1A, 1B, 2A, 2B, 3, 4, and 9-11 and a disengaged position as shown in FIG. 12. When in the engaged position, the cap 84 is coupled to the distal end 36 of the body 32 and prevents removal of the first modular insert 60 from the cavity 38 when in the cutting mode and the second modular insert 68 from the cavity 38 when in the burnishing mode such that one of the first and second modular inserts 60, 68 remain coupled to the actuator 44. More specifically, when in the engaged position, the cap 84 is coupled to the distal end 36 of the body 32 and prevents removal of the first modular insert 60 and the cutting member 62 from the cavity 38 when in the cutting mode and the second modular insert 68 and the burnishing member 70 from the cavity 38 when in the burnishing mode such that one of the first and second modular inserts 60, 68 remain coupled to the actuator 44. When the cap 84 is in the engaged position, the cap 84 rotates concurrently with rotation of the body 32 about the longitudinal axis L. Typically, the cap 84 covers the cavity 38 at the distal end 36 when the cap 84 is in the engaged position. Any suitable fasteners 86, etc. can be utilized to couple and decouple the cap 84 to the distal end 36 of the body 32.

When in the disengaged position, the cap 84 is spaced from the distal end 36 of the body 32 and allows independent removal of the first modular insert 60 from the cavity 38 when in the cutting mode and the second modular insert 68 from the cavity 38 when in the burnishing mode for uncoupling one of the first and second modular inserts 60, 68 from the actuator 44. More specifically, when in the disengaged position, the cap 84 is spaced from the distal end 36 of the body 32 and allows independent removal of the first modular insert 60 and the cutting member 62 from the cavity 38 when in the cutting mode and the second modular insert 68 and the burnishing member 70 from the cavity 38 when in the burnishing mode for uncoupling one of the first and second modular inserts 60, 68 from the actuator 44. In other words, the first and second modular inserts 60, 68 are independently removable from the extension 74 when the cap 84 is in the disengaged position. Hence, when the cap 84 is in the disengaged position, the first modular insert 60 or the second modular insert 68 can be slipped off the extension 74 at the second end 48 of the actuator 44.

For example, when burnishing is desired and the first modular insert 60 is currently coupled to the actuator 44, the cap 84 is disposed in the disengaged position and the first modular insert 60 and the cutting member 62 are removed from the actuator 44 by moving the first modular insert 60 along the longitudinal axis L to disengage from the extension 74 of the actuator 44; then, the second modular insert 68 and the burnishing member 70 move along the longitudinal axis L toward the extension 74 such that the second modular insert 68 engages the extension 74 to couple the second modular insert 68 to the actuator 44. Said differently, the first and second modular inserts 60, 68 are interchangeable. Thus, the device 20 can be utilized to cut or machine 22 the surface 24 of the work piece 26 by utilizing the first tool attachment assembly 56 and the same device 20, with only a switch to the second tool attachment assembly 58, can be utilized to burnish the surface 24 of the work piece 26.

Turning to FIGS. 1A, 1B, 2A, 2B, 3 and 4, optionally, the cap 84 includes a pilot 88 extending therefrom. The pilot 88 is typically rotatable concurrently with rotation of the cap 84 and the body 32 about the longitudinal axis L. It is to be appreciated that the pilot 88 can be integral with the cap 84 or the pilot 88 can be attached to the cap 84 by welding, fasteners, adhesives, and/or any other suitable method.

A collet 90 is optionally utilized for supporting the pilot 88 and thus the body 32. Typically, the collet 90 is utilized when the pilot 88 is utilized. The collet 90 is selectively disposed about the pilot 88 and selectively engages one of the apertures 30 of the work piece 26. The collet 90 is inserted into one of the apertures 30 to a desired location and then the collet 90 is expanded to engage the surfaces 24 of the aperture 30 and secure the collet 90 to the desired location. Typically, the collet 90 is secured to the aperture 30 of the work piece 26 proximal to the location that is to be cut or burnished. After the collet 90 is secured to the aperture 30, the device 20 is inserted into the aperture 30 and more specifically, the pilot 88 moves toward the collet 90. Typically, when the device 20 is inserted into the aperture 30 to the desired position, the pilot 88 will be disposed through the collet 90 such that the collet 90 supports the pilot 88 and thus the body 32 during rotation, etc.

As best shown in FIGS. 8-12, the device 20 also includes a first retainer 92 coupled to the cap 84 and a second retainer 94 coupled to the body 32 and spaced from the first retainer 92. More specifically, the second retainer 94 is coupled to the body 32 and the passage 82 of the actuator 44. The first modular insert 60 abuts the first retainer 92 when in the cutting mode and the second modular insert 68 abuts the first retainer 92 when in the burnishing mode for guiding the first and second modular inserts 60, 68 radially during movement between respective retracted and extended positions. Likewise, the first modular insert 60 abuts the second retainer 94 when in the cutting mode and the second modular insert 68 abuts the second retainer 94 when in the burnishing mode for guiding the first and second modular inserts 60, 68 radially during movement between respective retracted and extended positions.

More specifically, each of the first and second modular inserts 60, 68 include a first side 96 and a second side 98 spaced from each other along the longitudinal axis L with the first side 96 of respective first and second modular inserts 60, 68 abutting the first retainer 92 and the second side 98 of respective first and second modular inserts 60, 68 abutting the second retainer 94 for guiding the first and second modular inserts 60, 68 radially relative to the longitudinal axis L during movement of the actuator 44 between the first and second positions. In other words, the first modular insert 60 is disposed between the first and second retainers 92, 94 when in the cutting mode and the cap 84 is in the engaged position. Likewise, the second modular insert 68 is disposed between the first and second retainers 92, 94 when in the burnishing mode and the cap 84 is in the engaged position. The first retainer 92 remains coupled to the cap 84 when the cap 84 is in the disengaged position. It is to be appreciated that a portion of the second retainer 94 is removed in FIGS. 3 and 4 for illustrative purposes only to more clearly illustrate the actuator 44.

As best shown in FIG. 8, the cap 84 defines a first slit 100 extending away from the distal end 36 of the body 32 for receiving the first retainer 92. Additionally, the distal end 36 of the body 32 defines a second slit 102 extending toward the proximal end 34 of the body 32 for receiving the second retainer 94. Further, the first and second slits 100, 102 cooperate or align with each other for receiving the first tool attachment assembly 56 when in the cutting mode and the second tool attachment assembly 58 when in the burnishing mode. The second slit 102 is adjacent to or intersects the cavity 38 of the body 32 such that the first tool attachment assembly 56 is disposed in both the first and second slits 100, 102 and the cavity 38 when in the cutting mode. Likewise, the second tool attachment assembly 58 is disposed in both the first and second slits 100, 102 and the cavity 38 when in the burnishing mode. It is to be appreciated that the first and second slits 100, 102 can be reconfigured such that the first or second tool attachment assemblies 56, 58 can be disposed in one of the first and second slits 100, 102 instead of both of the first and second slits 100, 102.

Figure 9:
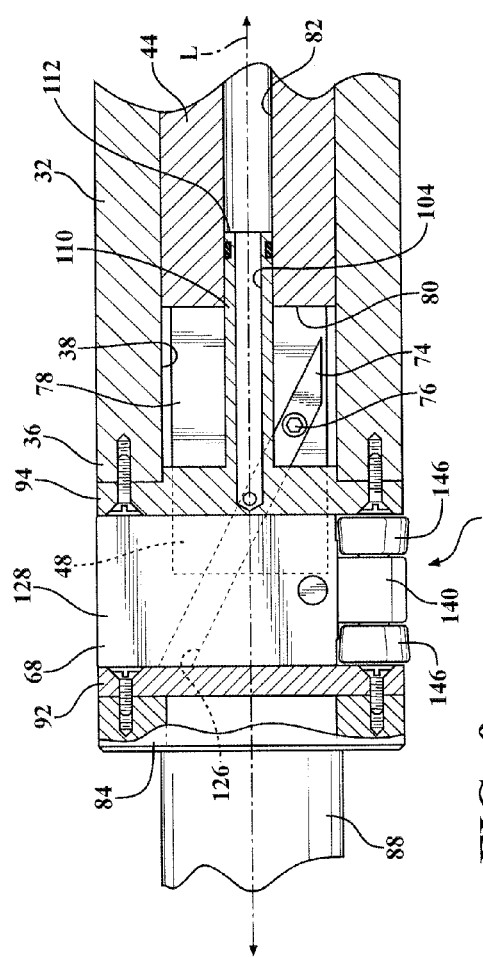
FIG. 9 is a partial cross-sectional view of device at the distal end of the body.

Also referring to FIGS. 9-11, the second retainer 94 defines a path 104 for providing fluid to the work piece 26 and the cutting member 62 when in the cutting mode and the burnishing member 70 when in the burnishing mode. Specifically, the path 104 of the second retainer 94 is in fluid communication with the passage 82 of the actuator 44 for guiding fluid from the actuator 44 through the second retainer 94 and to the work piece 26. More specifically, the path 104 of the second retainer 94 is in fluid communication with the passage 82 of the actuator 44 for guiding fluid from the actuator 44 through the second retainer 94, to the work piece 26 and the cutting member 62 when in the cutting mode and the burnishing member 70 when in the burnishing mode.

The path 104 includes a first outlet 106 and a second outlet 108 spaced from each other for providing fluid to the work piece 26 and the cutting member 62 when in the cutting mode and the burnishing member 70 when in the burnishing mode. In other words, the first and second outlets 106, 108 are in fluid communication with the passage 82 of the actuator 44. The first outlet 106 is adjacent one of the cutters 64 and the second outlet 108 is adjacent another one of the cutters 64 when in the cutting mode. The first and second outlets 106, 108 in relation to the burnishing member 70 will be discussed further below.

The second retainer 94 further includes a stem 110 extending along the longitudinal axis L to a terminal end 112. The terminal end 112 is coupled to the passage 82 and the path 104 extends through the stem 110. In addition, the second retainer 94 includes a finger 114 spaced from the stem 110 with the path 104 extending through the finger 114. More specifically, the first and second outlets 106, 108 of the path 104 are disposed in the finger 114.

The second retainer 94 further includes a front surface 116 facing the cap 84 and a back surface 118 facing the machine 22. The stem 110 extends outwardly from the back surface 118 away from the front surface 116. The finger 114 is disposed adjacent the front surface 116 and extends outwardly toward the cap 84. The front surface 116 and the finger 114 each abut the first modular insert 60 when in the cutting mode and the second modular insert 68 when in the burnishing mode. When the actuator 44 moves along the longitudinal axis L between the first and second positions, the shoulder 80 of the actuator 44 moves closer to or farther away from the back surface 118 of the second retainer 94. As such, when the actuator 44 moves between the first and second positions, more or less of the stem 110 will be disposed in the passage 82 of the actuator 44.

The distal end 36 of the body 32 defines a first channel 120 and a second channel 122 spaced from each other with the first channel 120 in fluid communication with the first outlet 106 and the second channel 122 in fluid communication with the second outlet 108 for providing fluid to the work piece 26 and the cutting member 62 when in the cutting mode and the burnishing member 70 when in the burnishing mode. In other words, the first outlet 106 of the second retainer 94 cooperates with or aligns with the first channel 120 and the second outlet 108 of the second retainer 94 cooperates with or aligns with the second channel 122 (see FIG. 10). Typically, the first and second channels 120, 122 are adjacent to or intersect the cavity 38 of the body 32 (see FIG. 8). The first channel 120 is adjacent one of the cutters 64 and the second channel 122 is adjacent another one of the cutters 64 when in the cutting mode for providing fluid to the work piece 26 and the cutting member 62, and specifically the cutters 64. The first and second channels 120, 122 in relation to the burnishing member 70 will be discussed further below.

Referring to FIGS. 5 and 7, each of the first and second modular inserts 60, 68 include a second coupler 124 selectively engaging the first coupler 72 independently of each other. In other words, the second coupler 124 selectively engages the extension 74 of the actuator 44. Typically, the second coupler 124 of each of the first and second modular inserts 60, 68 are further defined as a slot 126. The extension 74 is movably disposed in the slot 126 of respective first and second modular inserts 60, 68 for moving the first modular insert 60 between the retracted and extended positions when in the cutting mode and the second modular insert 68 between the retracted and extended positions when in the burnishing mode. The slot 126 of the first and second modular inserts 60, 68 is complementary in configuration to the extension 74. More specifically, the extension 74 extends angularly between the second end 48 and the shoulder 80 of the actuator 44 and the slot 126 of each of the first and second modular inserts 60, 68 extend angularly complementary to the extension 74. It is to be appreciated that the slot 126 of the first and second modular inserts 60, 68 and the extension 74 of the actuator 44 can be any suitable angle. Further, it is to be appreciated that the actuator 44 can define the slot 126 and the first and second modular inserts 60, 68 can each include the extension 74.

Each of the first and second modular inserts 60, 68 include a front side 128 and a back side 130 spaced from each other with the slot 126 of respective first and second modular inserts 60, 68 extending angularly along one of the front and back sides 128, 130 of respective first and second modular inserts 60, 68. Additionally, as discussed above, each of the first and second modular inserts 60, 68 include the first side 96 and the second side 98 spaced from each other along the longitudinal axis L. The first and second sides 96, 98 of respective first and second modular inserts 60, 68 are adjacent the front and back sides 128, 130 of respective first and second modular inserts 60, 68 such that the slot 126 of respective first and second modular inserts 60, 68 extend angularly along the back side 130 of respective first and second modular inserts 60, 68 and through a portion of the first and second sides 96, 98 of respective first and second modular inserts 60, 68 for allowing independent removal of the first and second modular inserts 60, 68 from the second end 48 of the actuator 44 when the cap 84 is in the disengaged position. The first side 96 of respective first and second modular inserts 60, 68 face the first retainer 92 and the cap 84 and the second side 98 of respective first and second modular inserts 60, 68 faces the second retainer 94 and the shoulder 80 of the actuator 44. Further, the front and back sides 128, 130 of respective first and second modular inserts 60, 68 are adjacent the first and second sides 96, 98 of respective first and second modular inserts 60, 68 to define a generally rectangular configuration. It is to be appreciated that the first and second modular inserts 60, 68 can be any suitable configuration.

Turning to FIGS. 13-17, the second modular insert 68 also includes a top side 132 and a bottom side 134 spaced from each other with each of the top and bottom side 132, 134 being adjacent the first side 96, the second side 98, the front side 128, and the back side 130 to further define the generally rectangular configuration. Again, it is to be appreciated that the second modular insert 68 can be any suitable configuration. The bottom side 134 of the second modular insert 68 defines a groove 136 extending a predetermined distance toward the top side 132 to define a base 138.

More specifically, the groove 136 is disposed through a portion of the first and second sides 96, 98 spaced from the slot 126 and spaced from the top side 132.

The second tool attachment assembly 58 includes a support 140 coupled to the second modular insert 68. More specifically, the support 140 is partially disposed in the groove 136 of the second modular insert 68. The support 140 includes a top surface 142 facing the base 138 of the second modular insert 68. More specifically, the top surface 142 is spaced from the base 138.

The support 140 further includes the burnishing member 70 coupled to the second modular insert 68 when in the burnishing mode for burnishing the surface 24 of the work piece 26. The support 140 is movable with the second modular insert 68 radially relative to the longitudinal axis L between the retracted position when the actuator 44 is in the first position for preventing engagement of the burnishing member 70 with the surface 24 of the work piece 26 and the extended position when the actuator 44 is in the second position for allowing engagement of the burnishing member 70 with the surface 24 of the work piece 26. More specifically, the burnishing member 70 is movable with the second modular insert 68 radially relative to the longitudinal axis L between the retracted position for preventing burnishing of the surface 24 of the work piece 26 and the extended position for burnishing the surface 24 of the work piece 26.

The burnishing member 70 includes a shaft 144 rotatably supported by the support 140 during burnishing of the surface 24 of the work piece 26. The shaft 144 is spaced from the top surface 142 of the support 140. The burnishing member 70 includes a plurality of rollers 146 spaced from each other and rotatably coupled to the support 140 for burnishing the surface 24 of the work piece 26. More specifically, the rollers 146 are rotatably coupled to the shaft 144 and are typically disposed at ends of the shaft 144. It is to be appreciated that the rollers 146 can be at any suitable location.

Figure 13:
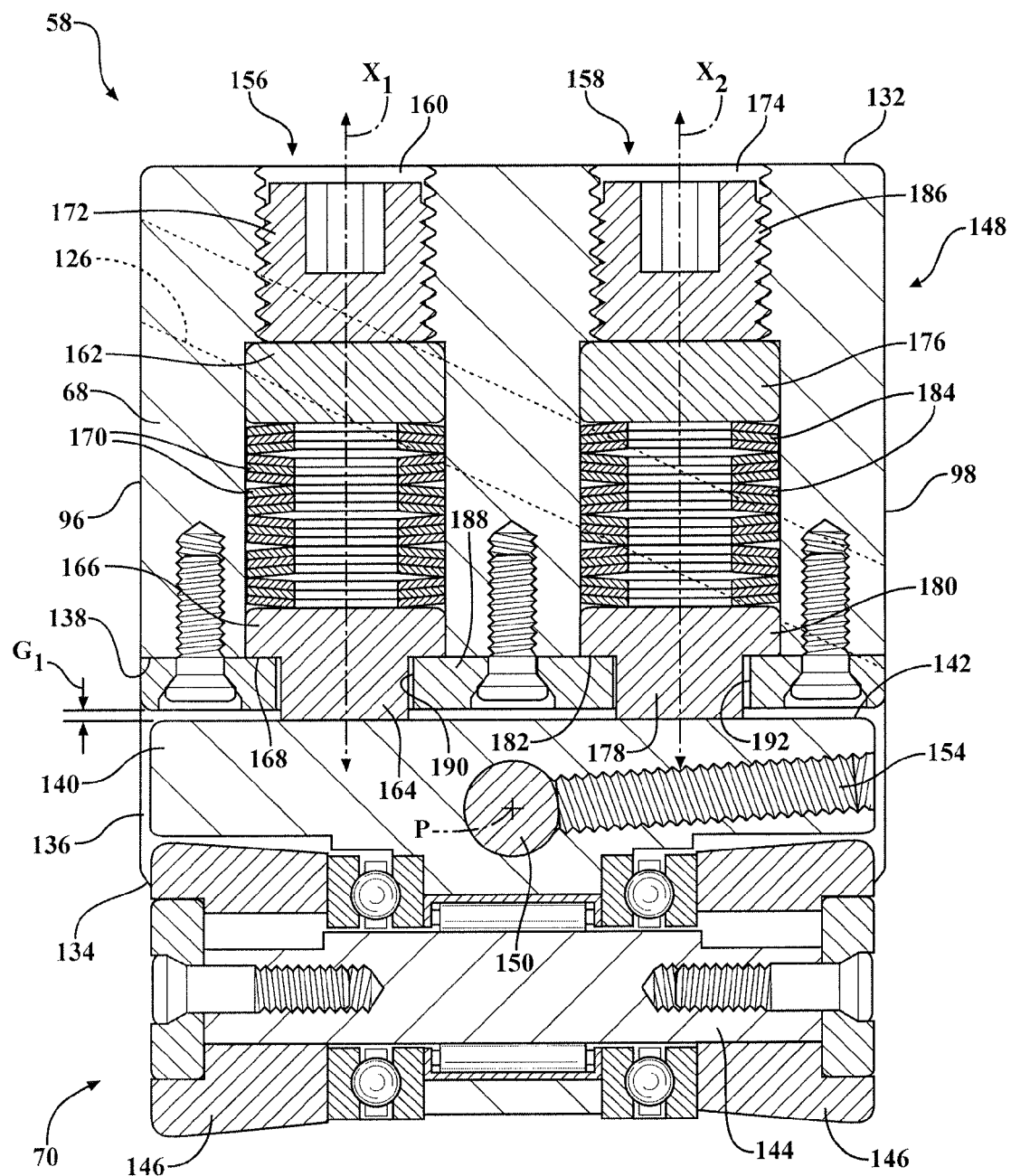
FIG. 13 is a cross-sectional view of a second tool attachment assembly of one configuration for the burnishing mode.
Figure 15:
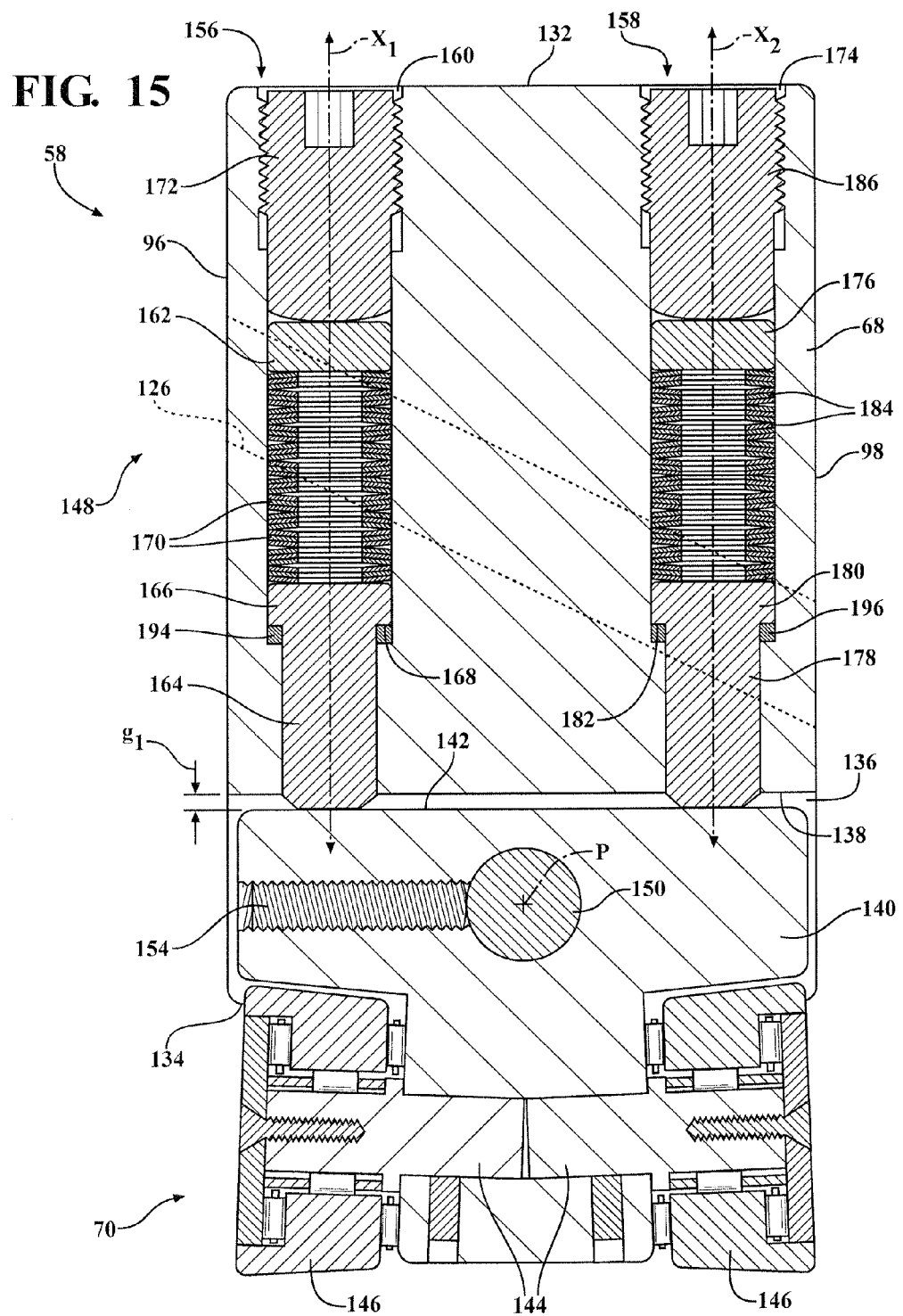
FIG. 15 is a cross-sectional view of the second tool attachment assembly of an alternative configuration for the burnishing mode.
Figure 17:
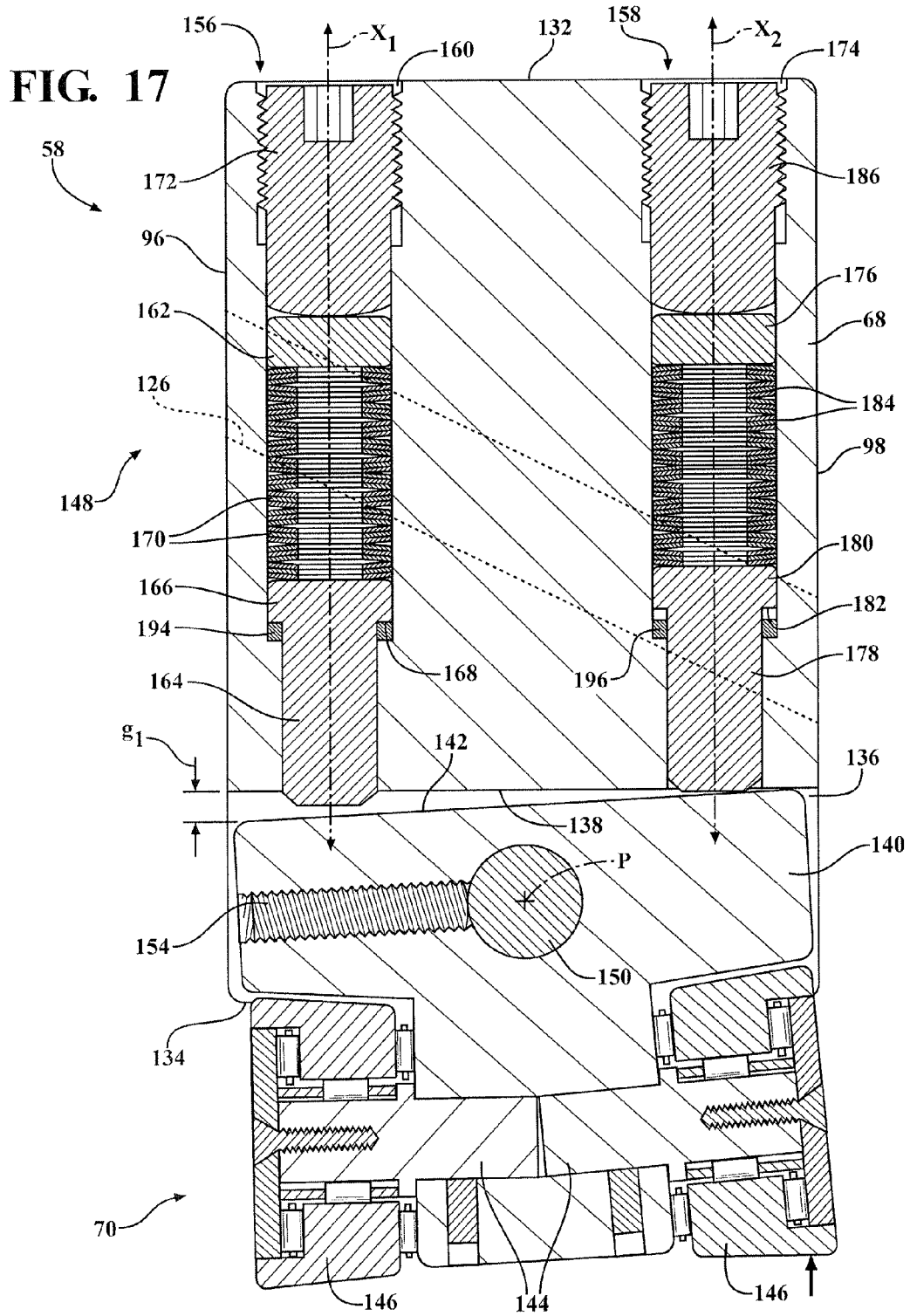
FIG. 17 is a cross-sectional view of the second tool attachment assembly of FIG. 15 with a reaction force applied to a burnishing member.

The burnishing member 70, and thus the rollers 146, allow for improving the finish of the surface 24 of the work piece 26. In other words, the burnishing member 70 and more specifically the rollers 146, plastically deform the surface 24 of the work piece 26 to improve the finish. In one configuration as best shown in FIG. 13, the shaft 144 and/or the rollers 146 rotate. In another configuration as best shown in FIGS. 15 and 17, the rollers 146 rotate independently of the shaft 144. It is to be appreciated that the burnishing member 70 can include a plurality of balls instead of rollers 146, can include balls and rollers 146, or any other suitable member for burnishing the surface 24 of the work piece 26. It is to also be appreciated that the rollers 146, balls, etc. can rotate or be stationary. Further, it is to be appreciated that the burnishing member 70 can include various other components, such as bearings, pins, fasteners, etc. for supporting the rollers 146, balls, etc. In addition, it is to be appreciated that a portion of the burnishing member 70 can be disposed in the groove 136 of the second modular insert 68.

Referring back to FIGS. 10 and 11, the first outlet 106 of the path 104 of the second retainer 94 is adjacent one of the rollers 146 and the second outlet 108 of the path 104 of the second retainer 94 is adjacent another one of the rollers 146 when in the burnishing mode. More specifically, the first channel 120 of the distal end 36 of the body 32 is adjacent one of the rollers 146 and the second channel 122 of the distal end 36 of the body 32 is adjacent another one of the rollers 146 when in the burnishing mode for providing fluid to the work piece 26 and the burnishing member 70, and specifically the rollers 146.

Turning to FIGS. 13-17, the second tool attachment assembly 58 further includes a biasing apparatus 148 coupled to the second modular insert 68 and engaging the support 140 to apply a first force to the support 140 and the burnishing member 70 with the support 140 being rotatable relative to the second modular insert 68 in response to a reaction force for improving the finish of the surface 24 of the work piece 26 when the burnishing member 70 engages the surface 24. Further, the configuration of the second tool attachment assembly 58 as discussed herein allows front and back diameters of the surfaces 24 of the apertures 30, as well as faces of the surfaces 24 of the apertures 30, to be burnished. Specifically, a very smooth finish of the surface 24 of the work piece 26 can be accomplished with the second tool attachment assembly 58. The reaction force is applied to the support 140 and the burnishing member 70 when the burnishing member 70, and more specifically the rollers 146, engages the surface 24 of the work piece 26. As such, having the support 140 and burnishing member 70 rotatable in response to the reaction force allows for improved finishing of the surfaces 24 of the work piece 26, as well as improved finishing of the front and back diameters of the surfaces 24 of the apertures 30 and the faces of the surfaces 24 of the apertures 30.

The second tool attachment assembly 58 also includes a pin 150 disposed through the second modular insert 68 and the support 140 along a pivot axis P for coupling the support 140 to the second modular insert 68 with the support 140 rotatable about the pivot axis P in response to the reaction force. More specifically, the second modular insert 68 and the support 140 each define an opening 152 along the pivot axis P for receiving the pin 150. Typically, the pivot axis P is transverse to the longitudinal axis L when the second modular insert 68 is coupled to the actuator 44.

A set screw 154 can be disposed through the support 140 for selectively engaging the pin 150. When the set screw 154 engages the pin 150, the pin 150 is maintained within the opening 152 of the support 140 and the second modular insert 68. When the set screw 154 is spaced from the pin 150, the pin 150 can be removed from the opening 152 of the support 140 and the second modular insert 68 to disassemble the support 140 and thus the burnishing member 70 from the second modular insert 68.

The biasing apparatus 148 includes a first biasing mechanism 156 coupled to the second modular insert 68 along a first axis $X_1$. The first biasing mechanism 156 engages the support 140 to apply the first force to the support 140 along the first axis $X_1$. The biasing apparatus 148 further includes a second biasing mechanism 158 coupled to the second modular insert 68 along a second axis $X_2$ with the first and second axes $X_1$, $X_2$ being spaced from each other such that the second biasing mechanism 158 engages the support 140 to apply a second force to the support 140 along the second axis $X_2$. The first and second axes $X_1$, $X_2$ are spaced substantially parallel to each other with the pivot axis P transverse to the first and second axes $X_1$, $X_2$. In addition, the pivot axis P is disposed between the first and second axes $X_1$, $X_2$. For example, in one alternative, the pivot axis P is disposed between the first and second axes $X_1$, $X_2$ and in a plane perpendicular to the first and second axes $X_1$, $X_2$.

The second modular insert 68 defines a first hole 160 along the first axis $X_1$ with the first biasing mechanism 156 disposed in the first hole 160. More specifically, the first hole 160 is defined through the top side 132 and the bottom side 134 of the second modular insert 68. Even more specifically, the first hole 160 is disposed through the base 138 of the second modular insert 68 such that the first hole 160 is adjacent or intersects the groove 136.

The first biasing mechanism 156 includes a first piston 162 and a second piston 164 each disposed in the first hole 160 with the second piston 164 engaging the support 140. Typically, the first and second pistons 162, 164 are spaced from each other. The second piston 164 includes a top 166 to define a ledge 168 which will be discussed further below. As such, the second piston 164 defines a generally t-shaped configuration. It is to be appreciated that the second piston 164 can be split into separate pieces. For example, the top 166 can be one piece and the remainder of the second piston 164 can be another piece. It is to be appreciated that the first and second pistons 162, 164 can define any suitable configuration.

The first biasing mechanism 156 includes a plurality of first biasing members 170 disposed in the first hole 160 for biasing the first and second pistons 162, 164. More specifically, the first biasing members 170 are disposed between the first and second pistons 162, 164 for biasing the second piston 164 into engagement with the support 140. Hence, one of the first biasing members 170 engages the top 166 of the second piston 164. The first biasing members 170 can be further defined as springs, and more specifically, as Belleville washers. It is to be appreciated that any suitable biasing member(s) can be utilized. It is to also be appreciated that one first biasing member 170 can be utilized instead of a plurality.

The first biasing mechanism 156 further includes a first fastener 172 disposed in the first hole 160 and engaging one of the first and second pistons 162, 164. The first fastener 172 is adjustable along the first axis $X_1$ for controlling the first force applied to the support 140. Typically, the first fastener 172 engages the first piston 162. When increasing the first force applied to the support 140 and the burnishing member 70, the first fastener 172 moves downwardly toward the support 140 which compresses the first biasing members 170 between the first and second pistons 162, 164 for increasing the first force applied to the second piston 164 and thus the support 140 and the burnishing member 70. When decreasing the first force applied to the support 140 and the burnishing member 70, the first fastener 172 moves upwardly away from the support 140 which reduces compression of the first biasing members 170 between the first and second pistons 162, 164 for decreasing the first force applied to the second piston 164 and thus the support 140 and the burnishing member 70.

The second modular insert 68 also defines a second hole 174 along the second axis $X_2$ with the second biasing mechanism 158 disposed in the second hole 174. More specifically, the second hole 174 is defined through the top side 132 and the bottom side 134 of the second modular insert 68. Even more specifically, the second hole 174 is disposed through the base 138 of the second modular insert 68 such that the second hole 174 is adjacent or intersects the groove 136.

The second biasing mechanism 158 includes a third piston 176 and a fourth piston 178 each disposed in the second hole 174 with the fourth piston 178 engaging the support 140.

Typically, the third and fourth pistons 176, 178 are spaced from each other. The fourth piston 178 includes a top 180 to define a ledge 182 which will be discussed further below. As such, the fourth piston 178 defines a generally t-shaped configuration. It is to be appreciated that the fourth piston 178 can be split into separate pieces. For example, the top 180 can be one piece and the remainder of the fourth piston 178 can be another piece. It is to be appreciated that the third and fourth pistons 176, 178 can define any suitable configuration.

The second biasing mechanism 158 includes a plurality of second biasing members 184 disposed in the second hole 174 for biasing the third and fourth pistons 176, 178. More specifically, the second biasing members 184 are disposed between the third and fourth pistons 176, 178 for biasing the fourth piston 178 into engagement with the support 140. Hence, one of the second biasing members 184 engages the top 180 of the fourth piston 178. The second biasing members 184 can be further defined as springs, and more specifically, as Belleville washers. It is to be appreciated that any suitable biasing member(s) can be utilized. It is to also be appreciated that one second biasing member 184 can be utilized instead of a plurality.

The second biasing mechanism 158 includes a second fastener 186 disposed in the second hole 174 and engaging one of the third and fourth pistons 176, 178. The second fastener 186 is adjustable along the second axis $X_2$ for controlling the second force applied to the support 140. Typically, the second fastener 186 engages the third piston 176. When increasing the second force applied to the support 140 and the burnishing member 70, the second fastener 186 moves downwardly toward the support 140 which compresses the second biasing members 184 between the third and fourth pistons 176, 178 for increasing the second force applied to the fourth piston 178 and thus the support 140 and the burnishing member 70. When decreasing the second force applied to the support 140 and the burnishing member 70, the second fastener 186 moves upwardly away from the support 140 which reduces compression of the second biasing members 184 between the third and fourth pistons 176, 178 for decreasing the second force applied to the fourth piston 178 and thus the support 140 and the burnishing member 70.

The second and fourth pistons 164, 178 engage the top surface 142 of the support 140 to apply the first and second forces respectively. Typically, the first and second fasteners 172, 186 are disposed the same distance within the first and second holes 160, 174 respectively for applying a uniform or even force to the support 140 and the burnishing member 70. In other words, typically, the first force equals the second force. It is to be appreciated that the first and second forces can be different from each other. Adjusting the first and second forces changes the amount of burnishing which occurs when the burnishing member 70 engages the surface 24 of the work piece 26. Further, being able to adjust the first and second forces allow more control of the amount of forces applied to the support 140 and the burnishing member 70.

Figure 14:
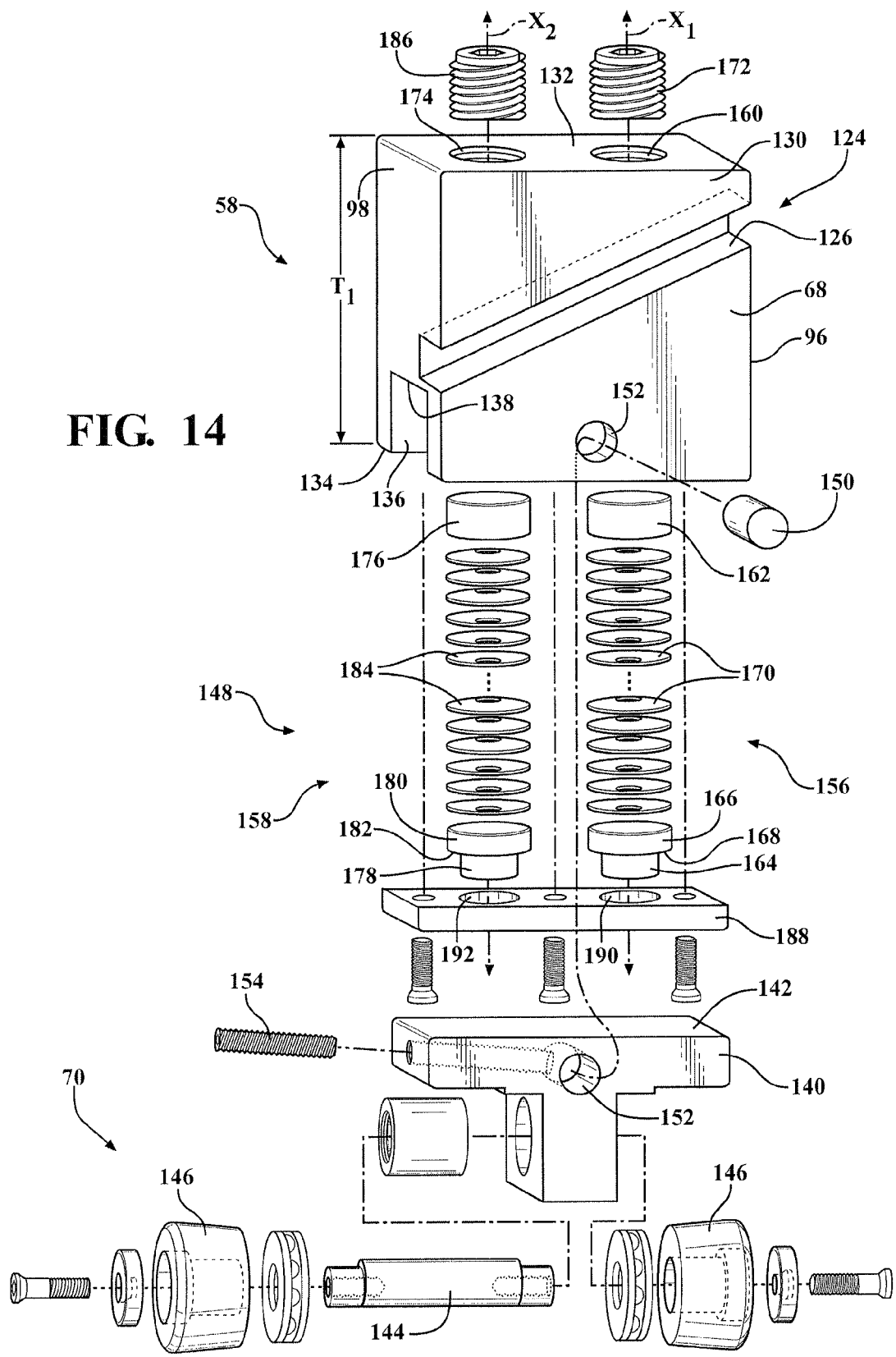
FIG. 14 is an exploded perspective view of the second tool attachment assembly of FIG. 13.

Depending on the outer diameter of the body 32, the overall size of the first and second tool attachment assemblies 56, 58 can correspondingly change. For example, the configuration of the first and second modular inserts 60, 68 can be changed. Referring to FIGS. 13 and 14, the second tool attachment assembly 58 is smaller than the second tool attachment assembly 58 illustrated in FIGS. 15-17.

With regard to the configuration of the second tool attachment assembly 58 as shown in FIGS. 13 and 14, the top and bottom sides 132, 134 of the second modular insert 68 are spaced from each other a first length $T_1$. The second tool attachment assembly 58 of this configuration includes a plate 188 defining a first bore 190 along the first axis $X_1$ and a second bore 192 along the second axis $X_2$. More specifically, the first bore 190 aligns with the first hole 160 and the second bore 192 aligns with the second hole 174. The second piston 164 is disposed through the first bore 190 of the plate 188 and the fourth piston 178 is disposed through the second bore 192 of the plate 188. The plate 188 is selectively coupled to the second modular insert 68 in the groove 136 and more specifically, the plate 188 engages the base 138 when coupled to the second modular insert 68. The first, second, third, and fourth pistons 162, 164, 176, 178, as well as the first and second biasing members 170, 184 are disposed in the second modular insert 68 prior to the plate 188 being coupled to the base 138 to assembly the internal components of the second modular insert 68.

The first and second forces are applied to the second and fourth pistons 164, 178, respectively such that the ledge 168, 182 of each of the second and fourth pistons 164, 178 abut the plate 188. The plate 188 and the top surface 142 of the support 140 are spaced from each other to define a first gap $G_1$ for allowing rotation of the support 140 about the pivot axis P in response to the reaction force. As such, when the reaction force is applied to the burnishing member 70 and thus the support 140, the burnishing member 70 and the support 140 rotate which causes one of the second and fourth pistons 164, 178 to move upwardly within the first and second holes 160, 174, respectively toward the first and second fasteners 172, 186, respectively. Hence, the first gap $G_1$ changes in response to rotation of the support 140. When the second piston 164 moves upwardly in response to the reaction force, the first biasing members 170 are further compressed and the ledge 168 of the second piston 164 moves away from the plate 188. When the fourth piston 178 moves upwardly in response to the reaction force, the second biasing members 184 are further compressed and the ledge 182 of the fourth piston 178 moves away from the plate 188. It is to be appreciated that the first gap $G_1$ can be any suitable size and is exaggerated in FIG. 13 for illustrative purposes only.

Figure 16:
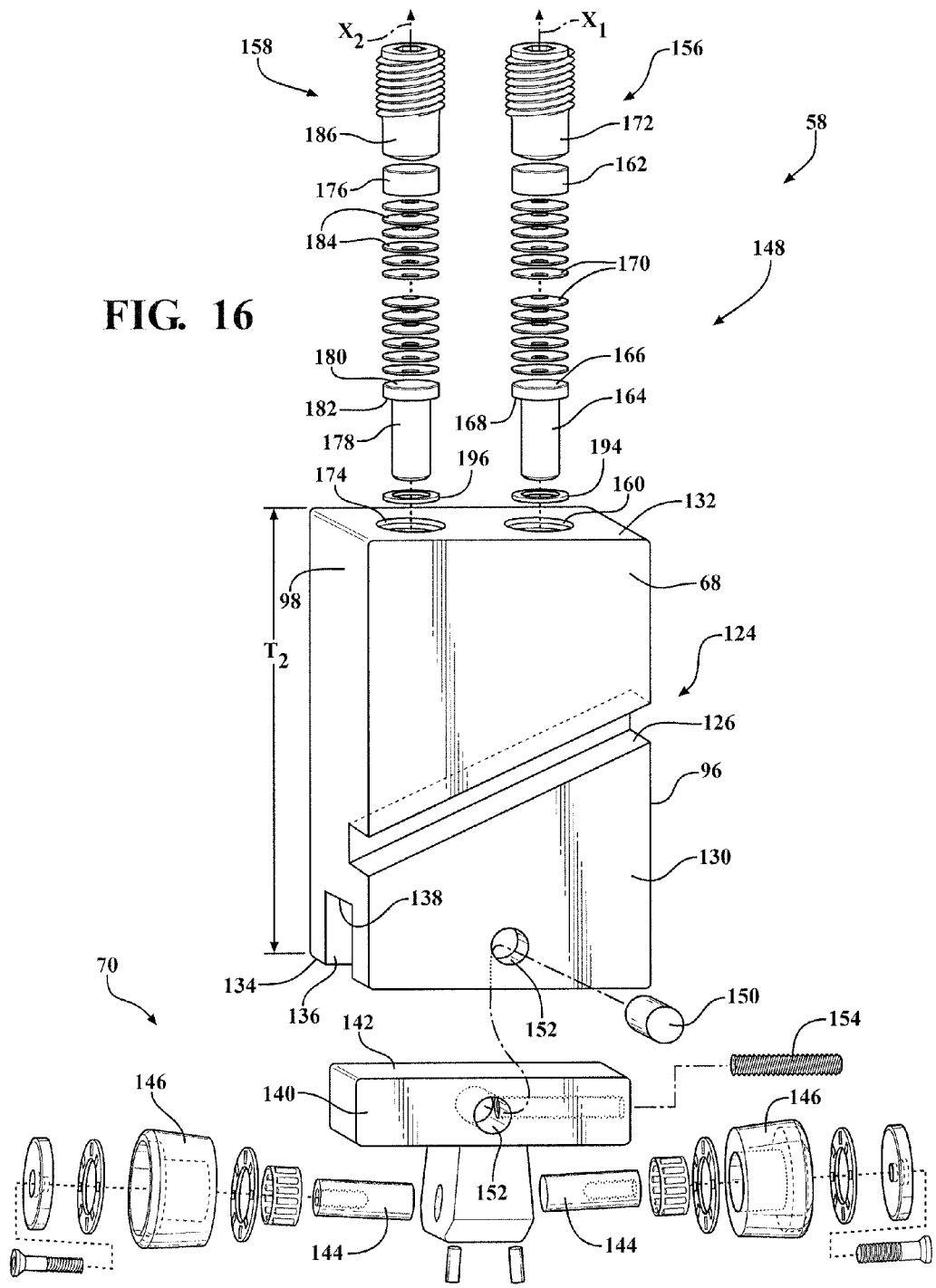
FIG. 16 is an exploded perspective view of the second tool attachment assembly of FIG. 15.

With regard to the configuration of the second tool attachment assembly 58 as shown in FIGS. 15-17, the top and bottom sides 132, 134 of the second modular insert 68 are spaced from each other a second length $T_2$. The second length $T_2$ is greater than the first length $T_1$ of the configuration of the second modular insert 68 of FIGS. 13 and 14. For the configuration of FIGS. 15-17, the plate 188 can be eliminated such that the first, second, third, and fourth pistons 162, 164, 176, 178, as well as the first and second biasing members 170, 184 can be disposed in the second modular insert 68 through the top side 132 of the second modular insert 68. In other words, the internal components of the second modular insert 68 can be dropped into the first and second holes 160, 174 from the top side 132 of the second modular insert 68.

In this configuration, the second and fourth pistons 164, 178 are elongated and likewise, the first and second fasteners 172, 186 are elongated. The first biasing mechanism 156 optionally includes a first spacer 194 disposed in the first hole 160 between a surface of the first hole 160 and the ledge 168 of the second piston 164. Likewise, the second biasing mechanism 158 optionally includes a second spacer 196 disposed in the second hole 174 between a surface of the second hole 174 and the ledge 182 of the fourth piston 178. The first and second forces are applied to the second and fourth pistons 164, 178 respectively such that the ledge 168, 182 of each of the second and fourth pistons 164, 178 abut the first and second spacers 194, 196, respectively.

Further, the base 138 of the second modular insert 68 and the top surface 142 of the support 140 are spaced from each other to define a first gap $g_1$ for allowing rotation of the support 140 about the pivot axis P in response to the reaction force. As such, when the reaction force is applied to the burnishing member 70 and thus the support 140, the burnishing member 70 and the support 140 rotate which causes one of the second and fourth pistons 164, 178 to move upwardly within the first and second holes 160, 174, respectively toward the first and second fasteners 172, 186, respectively. Hence, the first gap $g_1$ changes in response to rotation of the support 140. When the second piston 164 moves upwardly in response to the reaction force, the first biasing members 170 are further compressed and the ledge 168 of the second piston 164 moves away from the base 138. When the fourth piston 178 moves upwardly in response to the reaction force, the second biasing members 184 are further compressed and the ledge 182 of the fourth piston 178 moves away from the base 138. It is to be appreciated that the first gap $g_1$ can be any suitable size and is exaggerated in FIGS. 15 and 17 for illustrative purposes only. Also exaggerated in FIG. 17, for illustrative purposes only, is rotation of the support 140 and thus the burnishing member 70 in response to the reaction force and movement of the fourth piston 178 in response to the reaction force.

For example, as shown in FIG. 17, the reaction force is applied to one of the rollers 146 which causes the support 140 and the burnishing member 70 to rotate about the pivot axis P such that the fourth piston 178 moves upwardly within the second hole 174 toward the second fastener 186 to further compress the second biasing members 184. In the example of FIG. 17, the second piston 164 is spaced from the top surface 132 of the support 140 with the first gap $g_1$ decreasing in size from adjacent the second piston 164 to adjacent the fourth piston 178. Therefore, for example, the rollers 146 can rotate about the pivot axis P and into a corner of the diameter of the surface 24 of the aperture 30 being burnished for improved finishing of the surfaces 24 of the work piece 26. It is to be appreciated that the support 140 can rotate until the top surface 142 of the support 140 engages the base 138 for the embodiment of FIGS. 15-17 or the plate 188 for the embodiment of FIGS. 13 and 14. Further, it is to be appreciated that the support 140 and the burnishing member 70 can rotate about the pivot axis P such that the second and fourth pistons 164, 178 both remain engaged with the top surface 132 of the support 140 in response to the reaction force. Even though rotation of the support 140 and the burnishing member 70 about the pivot axis P and the movement of the second and fourth pistons 164, 178 in response to the reaction force with regard to FIGS. 13 and 14 are not illustrated, it is to be appreciated that FIG. 17 is illustrative of rotation/movement for the embodiment of FIGS. 13 and 14.

With regard to FIGS. 13-17, it is to be appreciated that the first, second, third, and fourth pistons 162, 164, 176, 178 can be any suitable configuration for applying the first and second forces and/or for accommodating different outer diameters of the body 32. In addition, with regard to FIGS. 13-17, it is to be appreciated that the configuration of the second and fourth pistons 164, 178 engaging the top surface 142 of the support 140 can be flat, arcuate, or any other suitable configuration. It is to be appreciated that the first modular insert 60 can be further defined as a plurality of first modular inserts 60 each coupled to the actuator 44 and each movable radially relative to the longitudinal axis L. In this configuration, each of the first modular inserts 60 are independently removable from the actuator 44 when in the cutting mode and the cap 84 is in the disengaged position. Further, it is to be appreciated that the second modular insert 68 can be further defined as a plurality of second modular inserts 68 each coupled to the actuator 44 and each movable radially relative to the longitudinal axis L. In this configuration, each of the second modular inserts 68 are independently removable from the actuator 44 when in the burnishing mode and the cap 84 is in the disengaged position. For illustrative purposes only, some of the details of at least FIGS. 1A, 1B, 2A, 2B, 3, and 4 are not shown for illustrating other components of the subject invention.

Many modifications and variations of the subject invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A device for burnishing a surface of a work piece, said device comprising:
    a body defining a cavity along a longitudinal axis with said body rotatable about said longitudinal axis;
    an actuator disposed in said cavity of said body and rotatable about said longitudinal axis concurrently with said rotation of said body and said actuator movable along said longitudinal axis between a first position and a second position;
    a modular insert coupled to said actuator and movable radially relative to said longitudinal axis between a retracted position when said actuator is in said first position and an extended position when said actuator is in said second position;
    a support coupled to said modular insert and having a burnishing member with said support movable with said modular insert radially relative to said longitudinal axis between said retracted position when said actuator is in said first position for preventing engagement of said burnishing member with the surface of the work piece and said extended position when said actuator is in said second position for allowing engagement of said burnishing member with the surface of the work piece;
    a biasing apparatus coupled to said modular insert and engaging said support to apply a first force to said support and said burnishing member with said support being rotatable relative to said modular insert in response to a reaction force for improving a finish of the surface of the work piece when said burnishing member engages the surface;
    wherein said biasing apparatus includes a first biasing mechanism coupled to said modular insert along a first axis with said first biasing mechanism engaging said support to apply said first force to said support along said first axis;
    wherein said biasing apparatus includes a second biasing mechanism coupled to said modular insert along a second axis with said first and second axes being spaced from each other such that said second biasing mechanism engages said support to apply a second force to said support along said second axis; and
    a pin disposed through said modular insert and said support along a pivot axis for coupling said support to said modular insert with said support rotatable about said pivot axis in response to said reaction force.

2. A device as set forth in claim 1 wherein said first and second axes are spaced substantially parallel to each other.

3. A device as set forth in claim 1 wherein said pivot axis is transverse to said first and second axes with said pivot axis disposed between said first and second axes.

4. A device as set forth in claim 1 wherein said modular insert defines a first hole along said first axis with said first biasing mechanism disposed in said first hole and a second hole along said second axis with said second biasing mechanism disposed in said second hole.

5. A device as set forth in claim 4 wherein said first biasing mechanism includes a first piston and a second piston each disposed in said first hole with said second piston engaging said support.

6. A device as set forth in claim 5 wherein said first biasing mechanism includes a plurality of first biasing members disposed in said first hole for biasing said first and second pistons.

7. A device as set forth in claim 6 wherein said first biasing members are disposed between said first and second pistons for biasing said second piston into engagement with said support.

8. A device as set forth in claim 4 wherein said first biasing mechanism includes a first fastener disposed in said first hole and engaging one of said first and second pistons with said first fastener adjustable along said first axis for controlling said first force applied to said support.

9. A device as set forth in claim 4 wherein said second biasing mechanism includes a third piston and a fourth piston each disposed in said second hole with said fourth piston engaging said support.

10. A device as set forth in claim 9 wherein said second biasing mechanism includes a plurality of second biasing members disposed in said second hole for biasing said third and fourth pistons.

11. A device as set forth in claim 10 wherein said second biasing members are disposed between said third and fourth pistons for biasing said fourth piston into engagement with said support.

12. A device as set forth in claim 4 wherein said second biasing mechanism includes a second fastener disposed in said second hole and engaging one of said third and fourth pistons with said second fastener adjustable along said second axis for controlling said second force applied to said support.

13. A device as set forth in claim 1 wherein said burnishing member includes a plurality of rollers spaced from each other and rotatably coupled to said support.

14. A device as set forth in claim 1 wherein said actuator includes an extension and said modular insert defines a slot with said extension movably disposed in said slot for moving said modular insert radially relative to said longitudinal axis between said retracted and extended positions.

15. A tool attachment assembly for a device including a body and an actuator disposed in the body, said assembly comprising:
a modular insert adapted to be coupled to the actuator;
a support coupled to said modular insert and having a burnishing member; and
a biasing apparatus coupled to said modular insert and engaging said support to apply a first force to said support and said burnishing member with said support being rotatable relative to said modular insert in response to a reaction force applied to said burnishing member;
wherein said biasing apparatus includes a first biasing mechanism coupled to said modular insert along a first axis with said first biasing mechanism engaging said support to apply said first force to said support along said first axis;
wherein said biasing apparatus includes a second biasing mechanism coupled to said modular insert along a second axis with said first and second axes being spaced from each other such that said second biasing mechanism engages said support to apply a second force to said support along said second axis; and
a pin disposed through said modular insert and said support along a pivot axis for coupling said support to said modular insert with said support rotatable about said pivot axis in response to said reaction force.

16. An assembly as set forth in claim 15 wherein said first and second axes are spaced substantially parallel to each other with said pivot axis transverse to said first and second axes and said pivot axis disposed between said first and second axes.

17. An assembly as set forth in claim 16 wherein said burnishing member includes a plurality of rollers spaced from each other and rotatably coupled to said support.

18. An assembly as set forth in claim 15 wherein said modular insert defines a first hole along said first axis with said first biasing mechanism disposed in said first hole and a second hole along said second axis with said second biasing mechanism disposed in said second hole.

19. An assembly as set forth in claim 18 wherein said first biasing mechanism includes a first piston and a second piston each disposed in said first hole with said second piston engaging said support.

20. An assembly as set forth in claim 19 wherein said first biasing mechanism includes a plurality of first biasing members disposed in said first hole for biasing said first and second pistons.

21. An assembly as set forth in claim 19 wherein said first biasing mechanism includes a first fastener disposed in said first hole and engaging one of said first and second pistons with said first fastener adjustable along said first axis for controlling said first force applied to said support.

22. An assembly as set forth in claim 18 wherein said second biasing mechanism includes a third piston and a fourth piston each disposed in said second hole with said fourth piston engaging said support.

23. An assembly as set forth in claim 22 wherein said second biasing mechanism includes a plurality of second biasing members disposed in said second hole for biasing said third and fourth pistons.

24. An assembly as set forth in claim 22 wherein said second biasing mechanism includes a second fastener disposed in said second hole and engaging one of said third and fourth pistons with said second fastener adjustable along said second axis for controlling said second force applied to said support.

25. An assembly as set forth in claim 15 wherein said burnishing member includes a plurality of rollers spaced from each other and rotatably coupled to said support.

26. An assembly as set forth in claim 15 wherein said burnishing member includes a plurality of rollers spaced from each other and rotatably coupled to said support.

* * * * *